(12) United States Patent
Matsumura et al.

(10) Patent No.: US 12,213,134 B2
(45) Date of Patent: Jan. 28, 2025

(54) TERMINAL AND RADIO COMMUNICATION METHOD FOR DEMODULATING A PDSCH USING A FIRST AND SECOND PRECODER BASED ON A DMRS

(71) Applicant: NTT DOCOMO, INC., Tokyo (JP)

(72) Inventors: Yuki Matsumura, Tokyo (JP); Satoshi Nagata, Tokyo (JP); Wenjia Liu, Beijing (CN); Lu Jiang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 343 days.

(21) Appl. No.: 17/784,350

(22) PCT Filed: Dec. 13, 2019

(86) PCT No.: PCT/JP2019/049057
§ 371 (c)(1),
(2) Date: Jun. 10, 2022

(87) PCT Pub. No.: WO2021/117249
PCT Pub. Date: Jun. 17, 2021

(65) Prior Publication Data
US 2023/0085090 A1    Mar. 16, 2023

(51) Int. Cl.
*H04W 72/1273* (2023.01)
*H04L 5/00* (2006.01)

(52) U.S. Cl.
CPC ....... *H04W 72/1273* (2013.01); *H04L 5/0051* (2013.01)

(58) Field of Classification Search
CPC .............. H04W 72/1273; H04W 16/28; H04L 5/0051; H04B 7/0456; H04B 7/0639
See application file for complete search history.

(56) References Cited

U.S. PATENT DOCUMENTS

| | | | | |
|---|---|---|---|---|
| 2012/0250642 A1* | 10/2012 | Qu | .................. | H04W 24/10 370/329 |
| 2017/0041906 A1* | 2/2017 | Tsai | ................... | H04W 52/262 |
| 2017/0048841 A1* | 2/2017 | Hwang | ............... | H04L 27/3483 |
| 2017/0094668 A1* | 3/2017 | Tsai | ................... | H04B 7/0619 |
| 2017/0264414 A1* | 9/2017 | Fröberg Olsson | .... | H04L 5/0005 |

(Continued)

OTHER PUBLICATIONS

International Search Report issued in PCT/JP2019/049057 on Jun. 23, 2020 (2 pages).

(Continued)

*Primary Examiner* — Afshawn M Towfighi
(74) *Attorney, Agent, or Firm* — Osha Bergman Watanabe & Burton LLP

(57) ABSTRACT

A terminal according to an aspect of the present disclosure includes a receiving section that receives demodulation reference signal (DMRS) information relating to at least one resource of a DMRS, to which at least one DMRS a first precoder for a beam is applied and a second precoder for superposing signals for a plurality of terminals in the beam is not applied, and a control section that demodulates a physical downlink shared channel (PDSCH) to which the first precoder and the second precoder are applied, based on the DMRS and information relating to the second precoder. According to an aspect of the present disclosure, downlink throughput using the MIMO can be improved.

12 Claims, 25 Drawing Sheets

(56) References Cited

U.S. PATENT DOCUMENTS

2017/0366377 A1\* 12/2017 Papasakellariou .... H04L 5/0053
2020/0229156 A1\* 7/2020 Park ...................... H04L 5/0051
2022/0029682 A1\* 1/2022 Park ..................... H04B 7/0626

OTHER PUBLICATIONS

Written Opinion of the International Searching Authority issued in PCT/JP2019/049057 on Jun. 23, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

TABLE I. A

| Index | NOMA precoder for one UE |
|---|---|
| ... | ... |

FIG. 10

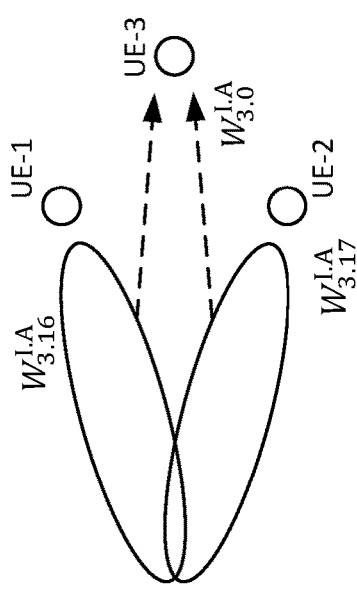

TABLE I.A

| Index | NOMA precoder for one user | Index | NOMA precoder for one user | Index | NOMA precoder for one user | Index | NOMA precoder for one user |
|---|---|---|---|---|---|---|---|
| 0 | $\begin{bmatrix}\sqrt{0.8}e^{j\frac{\pi}{8}}\\ \sqrt{0.8}e^{j\frac{5\pi}{8}}\end{bmatrix}$ | 8 | $\begin{bmatrix}\sqrt{0.8}e^{j\frac{\pi}{8}}\\ \sqrt{0.5}e^{j\frac{5\pi}{8}}\end{bmatrix}$ | 16 | $\begin{bmatrix}\sqrt{0.2}e^{j\frac{\pi}{8}}\\ 0\end{bmatrix}$ | 24 | $\begin{bmatrix}\sqrt{0.2}e^{-j\frac{\pi}{8}}\\ 0\end{bmatrix}$ |
| 1 | $\begin{bmatrix}\sqrt{0.7}e^{j\frac{\pi}{8}}\\ \sqrt{0.7}e^{j\frac{5\pi}{8}}\end{bmatrix}$ | 9 | $\begin{bmatrix}\sqrt{0.5}e^{j\frac{\pi}{8}}\\ \sqrt{0.8}e^{j\frac{5\pi}{8}}\end{bmatrix}$ | 17 | $\begin{bmatrix}0\\ \sqrt{0.2}e^{j\frac{5\pi}{8}}\end{bmatrix}$ | 25 | $\begin{bmatrix}0\\ \sqrt{0.2}e^{-j\frac{5\pi}{8}}\end{bmatrix}$ |
| 2 | $\begin{bmatrix}\sqrt{0.6}e^{j\frac{\pi}{8}}\\ \sqrt{0.6}e^{j\frac{5\pi}{8}}\end{bmatrix}$ | 10 | $\begin{bmatrix}\sqrt{0.7}e^{j\frac{\pi}{8}}\\ \sqrt{0.6}e^{j\frac{5\pi}{8}}\end{bmatrix}$ | 18 | $\begin{bmatrix}\sqrt{0.3}e^{j\frac{\pi}{8}}\\ 0\end{bmatrix}$ | 26 | $\begin{bmatrix}\sqrt{0.2}e^{-j\frac{\pi}{8}}\\ 0\end{bmatrix}$ |
| 3 | $\begin{bmatrix}\sqrt{0.5}e^{j\frac{\pi}{8}}\\ \sqrt{0.5}e^{j\frac{5\pi}{8}}\end{bmatrix}$ | 11 | $\begin{bmatrix}\sqrt{0.6}e^{j\frac{\pi}{8}}\\ \sqrt{0.7}e^{j\frac{5\pi}{8}}\end{bmatrix}$ | 19 | $\begin{bmatrix}0\\ \sqrt{0.3}e^{j\frac{5\pi}{8}}\end{bmatrix}$ | 27 | $\begin{bmatrix}0\\ \sqrt{0.3}e^{-j\frac{5\pi}{8}}\end{bmatrix}$ |
| 4 | $\begin{bmatrix}\sqrt{0.8}e^{j\frac{\pi}{8}}\\ \sqrt{0.7}e^{j\frac{5\pi}{8}}\end{bmatrix}$ | 12 | $\begin{bmatrix}\sqrt{0.7}e^{j\frac{\pi}{8}}\\ \sqrt{0.5}e^{j\frac{5\pi}{8}}\end{bmatrix}$ | 20 | $\begin{bmatrix}\sqrt{0.4}e^{j\frac{\pi}{8}}\\ 0\end{bmatrix}$ | 28 | $\begin{bmatrix}\sqrt{0.3}e^{-j\frac{\pi}{8}}\\ 0\end{bmatrix}$ |
| 5 | $\begin{bmatrix}\sqrt{0.7}e^{j\frac{\pi}{8}}\\ \sqrt{0.8}e^{j\frac{5\pi}{8}}\end{bmatrix}$ | 13 | $\begin{bmatrix}\sqrt{0.5}e^{j\frac{\pi}{8}}\\ \sqrt{0.7}e^{j\frac{5\pi}{8}}\end{bmatrix}$ | 21 | $\begin{bmatrix}0\\ \sqrt{0.4}e^{j\frac{5\pi}{8}}\end{bmatrix}$ | 29 | $\begin{bmatrix}0\\ \sqrt{0.4}e^{-j\frac{5\pi}{8}}\end{bmatrix}$ |
| 6 | $\begin{bmatrix}\sqrt{0.8}e^{j\frac{\pi}{8}}\\ \sqrt{0.6}e^{j\frac{5\pi}{8}}\end{bmatrix}$ | 14 | $\begin{bmatrix}\sqrt{0.6}e^{j\frac{\pi}{8}}\\ \sqrt{0.5}e^{j\frac{5\pi}{8}}\end{bmatrix}$ | 22 | $\begin{bmatrix}\sqrt{0.5}e^{j\frac{\pi}{8}}\\ 0\end{bmatrix}$ | 30 | $\begin{bmatrix}\sqrt{0.4}e^{-j\frac{\pi}{8}}\\ 0\end{bmatrix}$ |
| 7 | $\begin{bmatrix}\sqrt{0.6}e^{j\frac{\pi}{8}}\\ \sqrt{0.8}e^{j\frac{5\pi}{8}}\end{bmatrix}$ | 15 | $\begin{bmatrix}\sqrt{0.5}e^{j\frac{\pi}{8}}\\ \sqrt{0.6}e^{j\frac{5\pi}{8}}\end{bmatrix}$ | 23 | $\begin{bmatrix}0\\ \sqrt{0.5}e^{j\frac{5\pi}{8}}\end{bmatrix}$ | 31 | $\begin{bmatrix}0\\ \sqrt{0.5}e^{-j\frac{5\pi}{8}}\end{bmatrix}$ |

FIG. 11

FIG. 12A  Index ••• Precoder Matrix for two NOMA UEs ••• TABLE II.A-1

FIG. 12B  Index ••• Precoder Matrix for three NOMA UEs ••• TABLE II.A-2

FIG. 12C  Index ••• Precoder Matrix for four NOMA UEs ••• TABLE II.A-3

FIG. 12D  Index ••• Precoder Matrix for five NOMA UEs ••• TABLE II.A-4

| FIG. 14A | Index ••• | NOMA precoder for one UE ••• | TABLE III. A-1 |
|---|---|---|---|

| FIG. 14B | Index ••• | Precoder Matrix for two UEs ••• | TABLE III. A-2 |
|---|---|---|---|

| FIG. 14C | Index ••• | Precoder Matrix for three UEs ••• | TABLE III. A-3 |
|---|---|---|---|

| FIG. 14D | Index ••• | Precoder Matrix for four UEs ••• | TABLE III. A-4 |
|---|---|---|---|

FIG. 16

Table I.B

| MCS Index $I_{MCS}$ | Modulation Order $Q_M$ | Target code Rate R x [1024] | Spectral efficiency | NOMA precoder for one UE | MCS Index $I_{MCS}$ | Modulation Order $Q_M$ | Target code Rate R x [1024] | Spectral efficiency | NOMA precoder for one UE |
|---|---|---|---|---|---|---|---|---|---|
| 0 | 2 | 120 | 0.2344 | $\begin{bmatrix}\sqrt{0.8}e^{j\frac{\pi}{8}}\\\sqrt{0.8}e^{j\frac{5\pi}{8}}\end{bmatrix}$ | 16 | 4 | 340 | 1.3281 | $\begin{bmatrix}\sqrt{0.2}e^{j\frac{\pi}{8}}\\0\end{bmatrix}$ |
| 1 | 2 | 157 | 0.3066 | $\begin{bmatrix}\sqrt{0.7}e^{j\frac{\pi}{8}}\\\sqrt{0.7}e^{j\frac{5\pi}{8}}\end{bmatrix}$ | 17 | 4 | 378 | 1.4766 | $\begin{bmatrix}0\\\sqrt{0.2}e^{j\frac{5\pi}{8}}\end{bmatrix}$ |
| 2 | 2 | 193 | 0.3770 | $\begin{bmatrix}\sqrt{0.6}e^{j\frac{\pi}{8}}\\\sqrt{0.6}e^{j\frac{5\pi}{8}}\end{bmatrix}$ | 18 | 4 | 434 | 1.6953 | $\begin{bmatrix}\sqrt{0.3}e^{j\frac{\pi}{8}}\\0\end{bmatrix}$ |
| 3 | 2 | 251 | 0.4902 | $\begin{bmatrix}\sqrt{0.5}e^{j\frac{\pi}{8}}\\\sqrt{0.5}e^{j\frac{5\pi}{8}}\end{bmatrix}$ | 19 | 4 | 490 | 1.9141 | $\begin{bmatrix}0\\\sqrt{0.3}e^{j\frac{5\pi}{8}}\end{bmatrix}$ |
| 4 | 2 | 308 | 0.6016 | $\begin{bmatrix}\sqrt{0.8}e^{j\frac{\pi}{8}}\\\sqrt{0.7}e^{j\frac{5\pi}{8}}\end{bmatrix}$ | 20 | 4 | 553 | 2.1602 | $\begin{bmatrix}\sqrt{0.4}e^{j\frac{\pi}{8}}\\0\end{bmatrix}$ |
| 5 | 2 | 379 | 0.7402 | $\begin{bmatrix}\sqrt{0.7}e^{j\frac{\pi}{8}}\\\sqrt{0.8}e^{j\frac{5\pi}{8}}\end{bmatrix}$ | 21 | 4 | 616 | 2.4063 | $\begin{bmatrix}0\\\sqrt{0.4}e^{j\frac{5\pi}{8}}\end{bmatrix}$ |
| 6 | 2 | 449 | 0.8770 | $\begin{bmatrix}\sqrt{0.6}e^{j\frac{\pi}{8}}\\\sqrt{0.8}e^{j\frac{5\pi}{8}}\end{bmatrix}$ | 22 | 4 | 658 | 2.5703 | $\begin{bmatrix}\sqrt{0.5}e^{j\frac{\pi}{8}}\\0\end{bmatrix}$ |
| 7 | 2 | 526 | 1.0273 | $\begin{bmatrix}\sqrt{0.8}e^{j\frac{\pi}{8}}\\\sqrt{0.6}e^{j\frac{5\pi}{8}}\end{bmatrix}$ | 23 | 6 | 438 | 2.5664 | $\begin{bmatrix}0\\\sqrt{0.5}e^{j\frac{5\pi}{8}}\end{bmatrix}$ |
| 8 | 2 | 602 | 1.1758 | $\begin{bmatrix}\sqrt{0.8}e^{j\frac{\pi}{8}}\\\sqrt{0.5}e^{j\frac{5\pi}{8}}\end{bmatrix}$ | 24 | 6 | 466 | 2.7305 | $\begin{bmatrix}\sqrt{0.2}e^{j\frac{\pi}{8}}\\0\end{bmatrix}$ |
| 9 | 2 | 679 | 1.3262 | $\begin{bmatrix}\sqrt{0.5}e^{j\frac{\pi}{8}}\\\sqrt{0.8}e^{j\frac{5\pi}{8}}\end{bmatrix}$ | 25 | 6 | 517 | 3.0293 | $\begin{bmatrix}0\\\sqrt{0.2}e^{j\frac{5\pi}{8}}\end{bmatrix}$ |
| 10 | 4 | 340 | 1.3281 | $\begin{bmatrix}\sqrt{0.7}e^{j\frac{\pi}{8}}\\\sqrt{0.6}e^{j\frac{5\pi}{8}}\end{bmatrix}$ | 26 | 6 | 567 | 3.3223 | $\begin{bmatrix}\sqrt{0.3}e^{j\frac{\pi}{8}}\\0\end{bmatrix}$ |
| 11 | 4 | 378 | 1.4766 | $\begin{bmatrix}\sqrt{0.6}e^{j\frac{\pi}{8}}\\\sqrt{0.7}e^{j\frac{5\pi}{8}}\end{bmatrix}$ | 27 | 6 | 616 | 3.6094 | $\begin{bmatrix}0\\\sqrt{0.3}e^{j\frac{5\pi}{8}}\end{bmatrix}$ |
| 12 | 4 | 434 | 1.6953 | $\begin{bmatrix}\sqrt{0.7}e^{j\frac{\pi}{8}}\\\sqrt{0.5}e^{j\frac{5\pi}{8}}\end{bmatrix}$ | 28 | 6 | 666 | 3.9023 | $\begin{bmatrix}\sqrt{0.4}e^{j\frac{\pi}{8}}\\0\end{bmatrix}$ |
| 13 | 4 | 490 | 1.9141 | $\begin{bmatrix}\sqrt{0.5}e^{j\frac{\pi}{8}}\\\sqrt{0.7}e^{j\frac{5\pi}{8}}\end{bmatrix}$ | 29 | 6 | 719 | 4.2129 | $\begin{bmatrix}0\\\sqrt{0.4}e^{j\frac{5\pi}{8}}\end{bmatrix}$ |
| 14 | 4 | 553 | 2.1602 | $\begin{bmatrix}\sqrt{0.5}e^{j\frac{\pi}{8}}\\\sqrt{0.5}e^{j\frac{5\pi}{8}}\end{bmatrix}$ | 30 | 6 | 772 | 4.5234 | $\begin{bmatrix}\sqrt{0.5}e^{j\frac{\pi}{8}}\\0\end{bmatrix}$ |
| 15 | 4 | 616 | 2.4063 | $\begin{bmatrix}\sqrt{0.6}e^{j\frac{\pi}{8}}\\\sqrt{0.6}e^{j\frac{5\pi}{8}}\end{bmatrix}$ | 31 | 6 | 822 | 4.8164 | $\begin{bmatrix}0\\\sqrt{0.5}e^{j\frac{5\pi}{8}}\end{bmatrix}$ |

| Table II.B-1 | | | |
|---|---|---|---|
| MCS Index $I_{MCS}$ | Modulation Order $Q_M$ | Target code Rate R x [1024] | Spectral efficiency | Precoder Matrix for two NOMA UEs |
| ... | | | | |

| Table II.B-2 | | | |
|---|---|---|---|
| MCS Index $I_{MCS}$ | Modulation Order $Q_M$ | Target code Rate R x [1024] | Spectral efficiency | Precoder Matrix for three NOMA UEs |
| ... | | | | |

| Table II.B-3 | | | |
|---|---|---|---|
| MCS Index $I_{MCS}$ | Modulation Order $Q_M$ | Target code Rate R x [1024] | Spectral efficiency | Precoder Matrix for four NOMA UEs |
| ... | | | | |

| Table II.B-4 | | | |
|---|---|---|---|
| MCS Index $I_{MCS}$ | Modulation Order $Q_M$ | Target code Rate R x [1024] | Spectral efficiency | Precoder Matrix for five NOMA UEs |
| ... | | | | |

FIG. 18

Table II.B-2

| MCS Index $I_{MCS}$ | Modulation Order $Q_M$ | Target code Rate R × [1024] | Spectral efficiency | NOMA precoder for three UEs |
|---|---|---|---|---|
| 0 | [2,2,2] | [120,120,120] | [0.2344,0.2344, 0.2344] | |
| 1 | [2,2,2] | [157,157,120] | [0.3066,0.3066, 0.2344] | |
| 2 | [2,2,2] | [157,193,120] | [0.3066,0.3770, 0.2344] | |
| 3 | [4,2,2] | [340,193,251] | [1.3281,0.3770, 0.4902] | |
| 4 | [4,2,2] | [340,308,251] | [1.3281,0.6016, 0.4902] | |
| 5 | [2,4,2] | [379,340,308] | [0.7402,1.3281, 0.6016] | |
| 6 | [2,4,2] | [449,340,379] | [0.8770,1.3281, 0.7402] | |
| 7 | [6,4,2] | [438,378,308] | [2.5664,1.4766, 0.6016] | |
| 8 | [6,4,2] | [438,378,251] | [2.5664,1.4766, 0.4902] | |
| 9 | [6,4,4] | [466,679,340] | [2.7305,1.3262, 1.3281] | |
| 10 | [6,6,4] | [719,719,340] | [4.2129,4.2129, 1.3281] | |
| 11 | [4,4,2] | [378,434,251] | [1.4766,1.6953, 04902] | |
| 12 | [4,4,2] | [378,434,308] | [1.4766,1.6953, 0.6016] | |
| 13 | [4,4,2] | [340,490,193] | [1.3281,1.9141, 0.3770] | |
| 14 | [6,4,2] | [719,553,449] | [4.2129, 2.1602, 0.8770] | |
| 15 | [6,4,4] | [719,616,553] | [4.2129,2.4063, 2.1602] | |

Table III.B-1

| MCS Index $I_{MCS}$ | Modulation Order $Q_M$ | Target code Rate R x [1024] | Spectral efficiency | NOMA precoder for one UE |
|---|---|---|---|---|
| | | ... | | |

Table III.B-2

| MCS Index $I_{MCS}$ | Modulation Order $Q_M$ | Target code Rate R x [1024] | Spectral efficiency | Precoder Matrix for two NOMA UEs |
|---|---|---|---|---|
| | | ... | | |

Table III.B-3

| MCS Index $I_{MCS}$ | Modulation Order $Q_M$ | Target code Rate R x [1024] | Spectral efficiency | Precoder Matrix for three NOMA UEs |
|---|---|---|---|---|
| | | ... | | |

Table III.B-4

| MCS Index $I_{MCS}$ | Modulation Order $Q_M$ | Target code Rate R x [1024] | Spectral efficiency | Precoder Matrix for four NOMA UEs |
|---|---|---|---|---|
| | | ... | | |

FIG. 20

TERMINAL AND RADIO COMMUNICATION METHOD FOR DEMODULATING A PDSCH USING A FIRST AND SECOND PRECODER BASED ON A DMRS

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a study is underway to enhance multi-input multi-output (MIMO) to increase throughput.

However, a constraint on the number of radio frequency (RF) chains of a base station constrains improvements of downlink throughput and connectivity.

In view of this, an object of the present disclosure is to provide a terminal and a radio communication method that improve the downlink throughput using the MIMO.

Solution to Problem

A terminal according to an aspect of the present disclosure includes a receiving section that receives demodulation reference signal (DMRS) information relating to at least one resource of a DMRS, to which at least one DMRS a first precoder for a beam is applied and a second precoder for superposing signals for a plurality of terminals in the beam is not applied, and a control section that demodulates a physical downlink shared channel (PDSCH) to which the first precoder and the second precoder are applied, based on the DMRS and information relating to the second precoder.

Advantageous Effects of Invention

According to an aspect of the present disclosure, the downlink throughput using the MIMO can be improved.

BRIEF DESCRIPTION OF DRAWINGS

FIG. 10 is a diagram to show an example of a correspondence relation for a plurality of NOMA precoders with respect to a NOMA UE;

FIG. 11 a diagram to show an example of a UE positional relation and a correspondence relation for a plurality of NOMA precoders with respect to a NOMA UE;

FIGS. 12A to 12D are diagrams to show examples of a correspondence relation for a plurality of NOMA precoders with respect to a NOMA UE;

FIGS. 14A to 14D are diagrams to show examples of a correspondence relation for a plurality of NOMA precoders with respect to a NOMA UE;

FIG. 16 is a diagram to show an example of an MCS table according to a method 3-1-1;

FIG. 18 is a diagram to show examples of an MCS table according to a method 3-1-2;

FIG. 20 is a diagram to show an example of an MCS table according to a method 3-1-3;

DESCRIPTION OF EMBODIMENTS (Frequency Range)

Figure 1:
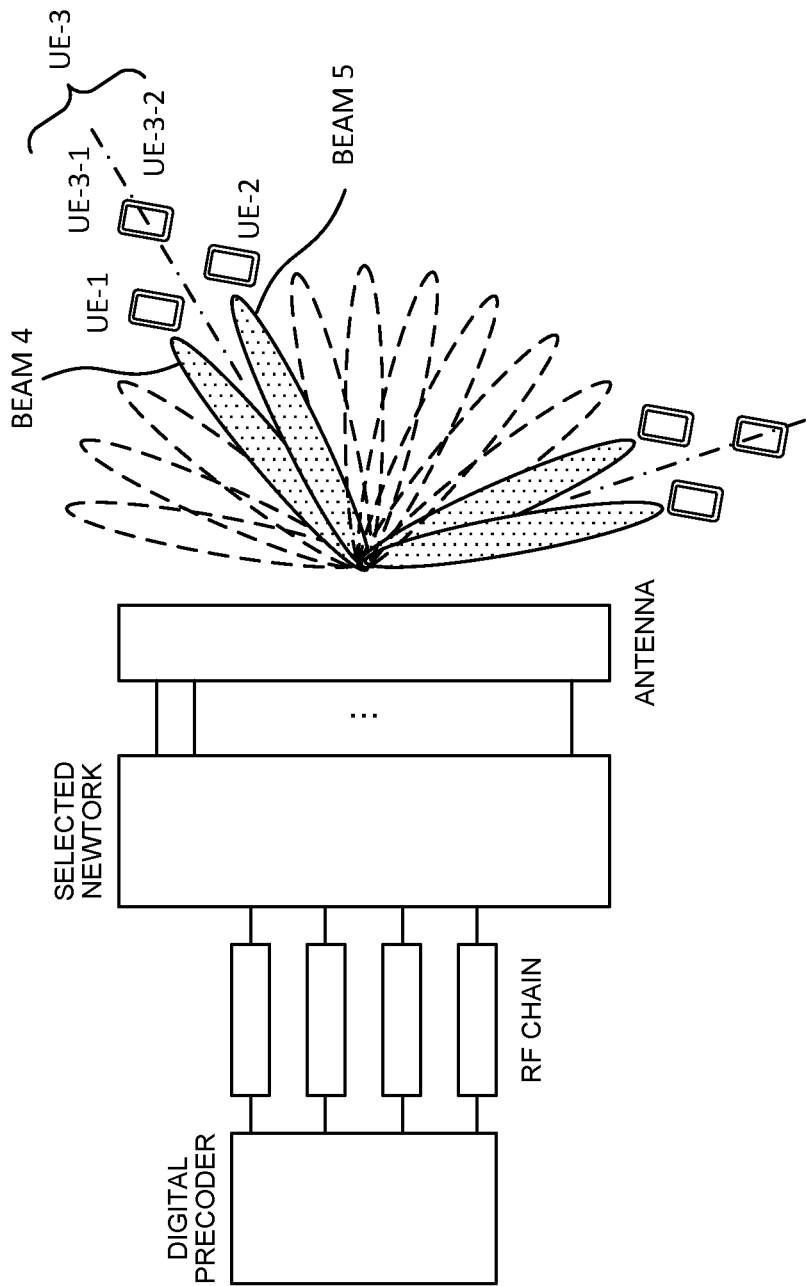
FIG. 1 is a diagram to show an example of an operation in a proposed scheme for a high-frequency MIMO-NOMA.

In Rel. 15 NR, a study is underway to use a frequency range (FR) up to 52.6 GHz. In NR in Rel. 16 or later versions, a study is underway to use a frequency band above 52.6 GHz. Note that a frequency range may be interpreted as a frequency band.

A frequency band above 52.6 GHz may be refer to as FR4. For example, FR4 may be from 52.6 GHz to 114.25 GHz. Note that as a frequency range in existing Rel. 15 NR, FR1 corresponds to 410 MHz to 7.152 GHz, and FR2 corresponds to 24.25 GHz to 52.6 GHz. FR4 may be referred to as FRX (X is an arbitrary string), or the like. In the present disclosure, FR2, FR4, a millimeter wave, and a high-frequency wave may be interchangeably interpreted.

(High-Frequency MIMO-NOMA)

DL multi-input multi-output (MIMO) in the high-frequency wave and constraint on the number of radio frequency (RF) chains (circuits) are under study. In the high-frequency DL MIMO using the constrained number of RF chains, high throughput and high connectivity are required.

As such, a study is underway to combine the high-frequency MIMO with the non-orthogonal multiple access (NOMA). In the present disclosure, the NOMA, multi-user superposition transmission (MUST), and user multiplexing without using orthogonal resources may be interchangeably interpreted. Application of the NOMA can increase the number of users (UEs) and improve a frequency use efficiency. A high directivity in the high-frequency wave is preferable for the NOMA because correlation between a plurality of UE channels in the beams is high.

For example, the NOMA includes power domain (PD)-NOMA, code domain (CD))-NOMA, and the like. In the PD-NOMA, a transmission power is differentiated depending on a difference in a channel gain (for example, a path loss, a signal-to-noise and interference ratio (SINR)), a signal-to-noise ratio (SNR)), and the like) to multiplex a plurality UEs in the same time and frequency resources. For example, the path loss in a cell increases from a cell center toward a cell edge. For this reason, a base station transmits a DL signal for a UE 2 at the cell edge where the path loss is larger (or the channel gain is smaller) by using a transmission power larger than that for a DL signal for a UE 1 at the cell center where the path loss is smaller (or the channel gain is larger) and superposing the DL signal for the UE 1 and the DL signal for the UE 2 on each other. On the other hand, the UE can cancel interference signals (DL signals for other UEs) from a received signal by canceler (for example, Successive Interference Cancellation (SIC)) to extract a DL signal for the UE.

Specifically, the UE can remove DL signals, for other UEs, having reception SINR lower than a reception SINR of the UE, to extract a DL signal for the UE itself. For example, a DL signal for the UE 2 is transmitted using a transmission power larger than for a DL signal for the UE 1. Accordingly, the UE 1 receives the DL signal for the UE 2 as an interference signal, but can appropriately cancel the interference signal by the SIC. As a result, the UE 1 can extract and appropriately decode the DL signal for the UE 1. On the other hand, the DL signal for the UE 1 is transmitted using a transmission power smaller than for the DL signal for the UE 2. For this reason, the UE 2 can ignore interference by the DL signal for the UE 1 and may not cancel the interference by the SIC. In this manner, in a case that the PD-NOMA is applied in the downlink, the plurality of UEs, UEs 1 and 2, that are different in the channel gain can be multiplexed (superposed) in the power domain in the identical time resource and identical frequency resource, and thus, the frequency use efficiency can be improved.

In the high-frequency MIMO, single-beam NOMA and multi-beam NOMA are under study.

The single-beam NOMA applies the NOMA to a plurality of UEs in a single beam. The UEs to which the NOMA is applied (NOMA-UE) are grouped by channel correlation. However, since the beam is narrow, user (UE) pairing for the NOMA has low probability. The user pairing may be pairing with a near UE and a far UE. A wide beam increases the probability of the user pairing, but decreases a beamforming gain.

The multi-beam NOMA applies the NOMA to a plurality of UEs in a plurality of beams. The base station generates a plurality of beams by antenna division and beam division in one RF chain. However, a plurality of analog beams by the beam division decrease the beamforming gain. Although the plurality of beams ease accommodating more UEs, the gain of each beam decreases.

As such, the inventors of the present invention came up with a high-frequency MIMO-NOMA scheme for improving a data rate. According to this scheme, the probability of the NOMA user pairing can be increased to improve a data rate of UE other than a beam direction.

Hereinafter, embodiments according to the present disclosure will be described in detail with reference to the drawings. The radio communication method according to each embodiment may be employed independently or may be employed in combination.

In the present disclosure, a near UE, a cell-center UE, and a strong UE may be interchangeably interpreted. In the present disclosure, a far UE, a cell-edge UE, and a weak UE may be interchangeably interpreted. In the present disclosure, a UE and a user may be interchangeably interpreted.

In the present disclosure, ID, index, number, order, priority, and position may be interchangeably interpreted.

(Radio Communication Method)

<<Proposed Scheme for High-Frequency MIMO-NOMA>>

Services for a plurality of UEs may be provided via a group of beams. The group of beams may be generated by a plurality of RF chains. The number of RF chains may be smaller than the number of UEs. The number of beams generated by a base station may be smaller than the number of UEs receiving signals multiplexed via the high-frequency MIMO-NOMA.

For example, as shown in FIG. 1, services for the UEs 1, 2, and 3 may be provided via two beams. The UE 3 may be divided into two virtual UEs 3-1 and 3-2. Services for the UE 1 and the UE 3-1 may be provided via a beam 4, and data for the UE 1 and the UE 3-1 may be multiplexed via the NOMA. Services for the UE 2 and the UE 3-2 may be provided via a beam 5 using the NOMA, and data for the UE 2 and the UE 3-2 may be multiplexed via the NOMA.

The proposed scheme may introduce an additional UE-specific NOMA precoder to an existing MIMO precoder. The NOMA precoder may be optimized such that a total data rate depending on minimum data rate requirements is maximized.

The user pairing probability in the proposed scheme is higher than a user pairing probability in the power domain ((PD) NOMA. In a case that the minimum data rate requirements are met, the total rate in the proposed scheme (total rate with quality of service (QoS) constraint) is higher than a total rate in the PD-NOMA.

[Option 1]

Figure 2B:
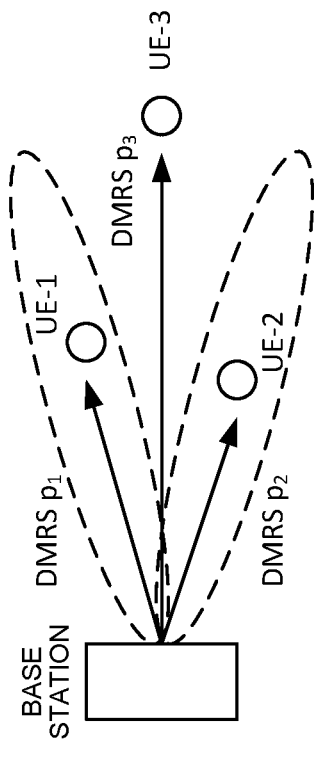
FIGS. 2A to 2B are diagrams to show examples of a DMRS in the proposed scheme.
Figure 2A:
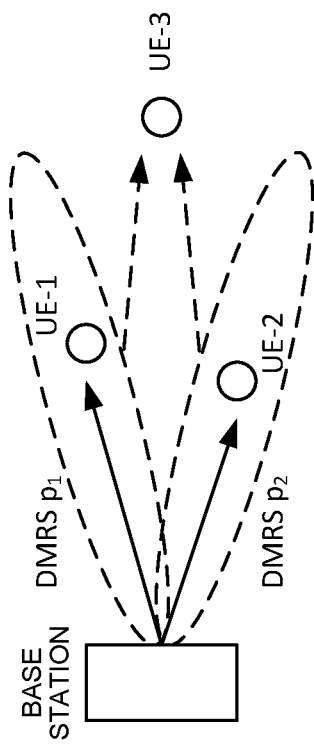

A DMRS corresponding to a near UE may be transmitted. As shown in FIG. 2A, two DMRSs may be transmitted to two respective near UEs. The respective DMRSs are precoded by a MIMO precoder for the UE 1 and the UE 2, but not precoded by a UE-specific NOMA precoder.

Each of the UEs 1 and 2 may receive a corresponding UE-specific DMRS to estimate an equivalent channel in accordance with the received DMRS. The UE 3 may receive two UE-specific DMRSs to estimate equivalent channels of two beams in accordance with the received DMRS.

[Option 2]

A DMRS corresponding to each UE may be transmitted. As shown in FIG. 2B, three DMRSs may be transmitted to three respective UEs. Each of the DMRSs may be precoded by both the MIMO precoder and the UE-specific NOMA precoder.

Each of the UEs 1, 2, and 3 may receive a corresponding UE-specific DMRS to estimate an equivalent channel in accordance with the received DMRS. The NOMA precoder may be included in the DMRS for this function of data detection.

The option 2 enables NOMA transmission transparent for the UE. However, the option 2 requires the number of orthogonal DMRS ports equal to the number of UEs, and so, is not preferable in NR that can use only 12 ports.

The option 1 can support higher connectivity without increase in the number of DMRS ports. Hereinafter, the high-frequency MIMO-NOMA scheme using the option 1 will be described.

In order to support the option 1, two DMRSs for three UEs may comply with the following configurations.

The UE 1 is configured with a DMRS resource 1.
The UE 2 is configured with the DMRS resource 1.
The UE 3 is configured with DMRS resources 1 and 2.

One DMRS resource may be configured for the UE (for example, the UE 1 and UE 2) provided with a service via one beam similar to Rel. 15 NR. A plurality of DMRS resources may be configured for the UE (for example, UE 3) provided with services via a plurality of beams in the proposed scheme.

The proposed scheme is not transparent to the UE. The UE needs to know information relating to a configuration in a transmitter to appropriately detect a signal. The existing MIMO precoder and signaling procedure defined in Rel. 15 do not support the proposed scheme.

The base station in Rel. 15 NR may use a two-stage precoding as expressed by an equation below. Information for the two-stage precoding may be fed back by the UE.

[Math. 1]

$$W = W_1 \times W_2 = \begin{bmatrix} B & \\ & B \end{bmatrix} \times \frac{1}{\sqrt{N_1 N_2}} \begin{bmatrix} p \\ \varphi p \end{bmatrix} \quad \text{(Equation 1)}$$

W may represent a precoder (MIMO precoder). $W_1$ may represent wide band and long-term channel properties. $W_2$ may represent a dynamic column selection (subband, frequency-selective) and a short-term channel properties. In $W_1$, a matrix B represents an L-times oversampled two-dimensional discrete Fourier transform (DFT) beam. L may represent the number of beams. In $W_2$, $N_1$ represents the number of antennas per a polarization in a first dimension direction (horizontal polarization and vertical polarization) in a panel. $N_2$ represents the number of antennas per a polarization in a second dimension direction in a panel. $N_1 N_2$ represents the number of antennas (antenna ports) per a polarization. $\varphi$ (or $\varphi''$) represents a co-phasing term (phase difference between different polarizations). p represents a vector for selection of one beam (row of the matrix B) (beam selection vector), that is a row of an identity matrix $I_{N_1 \times N_2}$.

For the NOMA, signatures used in the base station (parameters, for example, power, phase, sequence, precoder, and the like) may be assigned and notified to the UE for data detection.

The NOMA in the proposed scheme may be different from UL code domain (CD)-NOMA having a power constraint in each UE. The proposed scheme may require a total power constraint in each beam. The UL CD-NOMA is not optimal for DL.

<<Grouping>>

The UEs may be grouped (paired) by a similar equivalent channel. The grouped UEs may be paired based on a received power (such as path loss). One beam may be used for and the NOMA may be applied to the paired UEs. The similar equivalent channel may be represented by at least one of grouping methods 1 to 3 below.

[Grouping Method 1]

The UEs similar in at least one of an angle of arrival (AoA) and angle of departure (AoD) may be grouped. At least one of the AoA and the AoD may be grouped by means of a threshold.

[Grouping Method 2]

Figure 3C:
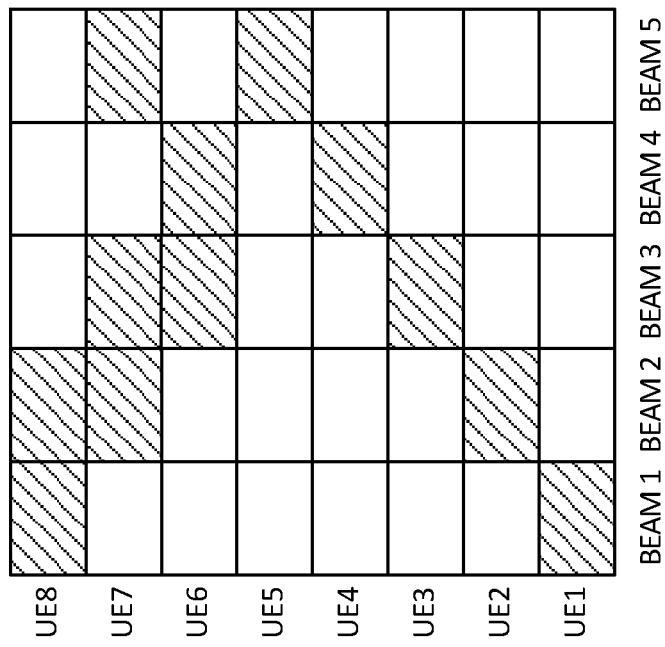
FIGS. 3A to 3C are diagrams to show examples of a grouping method.
Figure 3A:
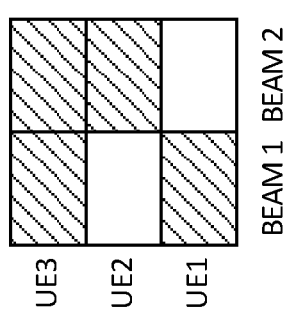
Figure 3B:
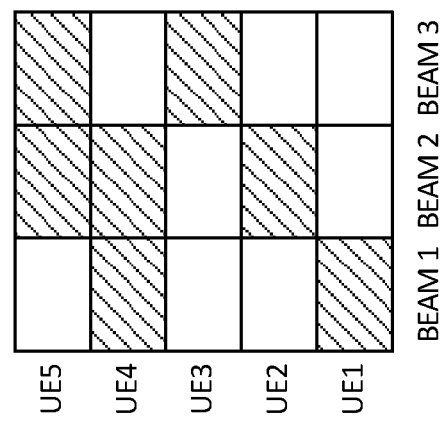

The UEs may be grouped by means of the beams selected by the UEs. A difference between beam labels (indices) selected by the grouped UEs may be small. A difference between beam levels measured by the grouped UEs may be small. For example, as shown in FIGS. 3A to 3C, the UEs may be grouped. For example, as shown in FIG. 3A, in a case that two beams provide services to three UEs, each beam may provide the service to two UEs. For example, as shown in FIG. 3B, in a case that three beams provide services to five UEs, each beam may provide the service to two or three UEs. For example, as shown in FIG. 3C, in a case that five beams provide services to eight UEs, each beam may provide the service to two or three UEs. One beam may provide a service to more than two UEs.

[Grouping Method 3]

The UEs with the channels having strong correlation may be grouped. A correlation $C_{1,2}$ between the UE 1 and the UE 2 may be expressed by an equation below.

[Math. 2]

$$C_{1,2} = \frac{|h_1 h_2^H|}{\|h_1\| \cdot \|h_2\|} \quad \text{(Equation 2)}$$

<<Beam Selection>>

The beam used for the service to the UE may be selected based on at least one of the following beam selection methods 1 to 3.

<<Beam Selection Method 1>>

Maximum Magnitude Election (MM-S)

A sparsity mask $M^{(k)}$ for the k-th UE (UE-k) may be given by an equation below. $M^{(k)}$ may be determined by a threshold $\xi^{(k)} \in (0, 1)$. The mask may represent a dominant beam selected for transmission. $h_{i,k}$ represents the i-th beam for the UE-k of a beam space channel.

[Math. 3]

$$M^{(k)} = \left\{ i \in I(n) : |h_{i,k}|^2 \geq \xi^{(k)} \max_i |h_{i,k}|^2 \right\}$$ (Equation 3)

<<Beam Selection Method 2>>
Maximization of Capacity (Accommodation Number)
<<Beam Selection Method 3>>
Maximization of Signal-to-Noise and Interference Ratio (SINR)
<<Multi-User Precoding Design>>

In order to provide services to the UE group using a plurality of beams, multi-user precoding may be designed based on at least one of the following designs 1 to 3.
[Design 1]
Approximation of Optimal Solution Infinitely An optimal solution $F_{opt}$ for full-digital beamforming may be given by an expression below. $F_{RF}F_{BB}$ represents a hybrid beamforming (HBF) matrix. $F_{BB}$ represents a digital precoding matrix applied in the base band, and $F_{RF}$ represents an analog precoding matrix applied in the RF.

[Math. 4]

$$\|F_{opt} - F_{RF}F_{BB}\|_F$$ (Expression 4)

[Design 2]
Maximization of Total Rate, Total Capacity, and the Like
[Design 3]
 Minimization of Transmission Power First Embodiment The NOMA precoder may be added to the MIMO precoder. For example, a precoder for the MIMO-NOMA system may be a precoder $W = W_1 \times W_2 \times W_3$.

The MIMO precoder $W_1 \times W_2$ is a complex matrix with elements of $N_1 N_2 \times N_{Beam}$ complex numbers, and may be given by an expression below.

[Math. 5]

$$W_1 \times W_2 \in \mathbb{C}^{N1N2 \times NBeam}$$ (Expression 5)

The NOMA precoder $W_3$ is a complex matrix with elements of $N_{Beam} \times K$ complex numbers, and may be given by a relationship below.

[Math. 6]

$$W_3 \in \mathbb{C}^{NBeam \times K}$$ (Expression 6)

$W_3$ may map signal streams for K NOMA UEs to $N_{Beam}$ equivalent channels (beams). $W_3$ may be multiplied to $W_1 \times W_2$ later. The i-th column of $W_3$ represents a NOMA precoding vector for a UE-i.

$W_3$ may be referred to as, instead of the NOMA precoder, superposition parameters for a plurality of beams or a plurality of precoders, weighted parameters, or the like. In order to support the UEs more than the number of DMRS ports, the DMRS may be precoded by $W = W_1 \times W_2$, and the data may be precoded by $W = W_1 \times W_2 \times W_3$.

Example 1

Figure 4B:
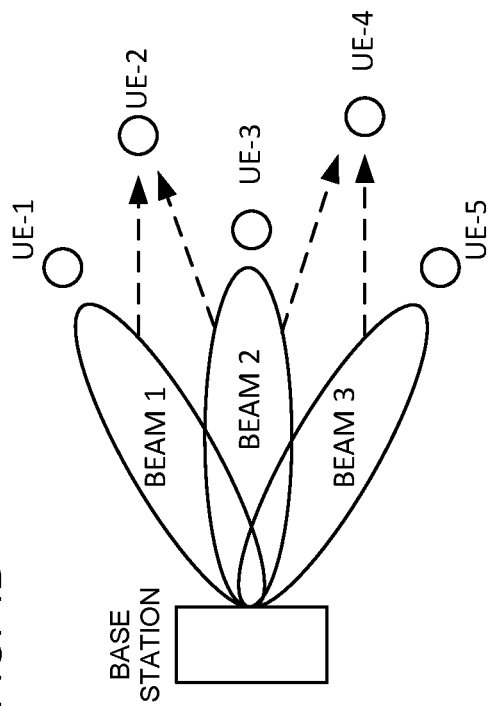
FIGS. 4A and 4B are diagrams to show examples of a plurality of UEs provided with services via a plurality of beams.
Figure 4A:
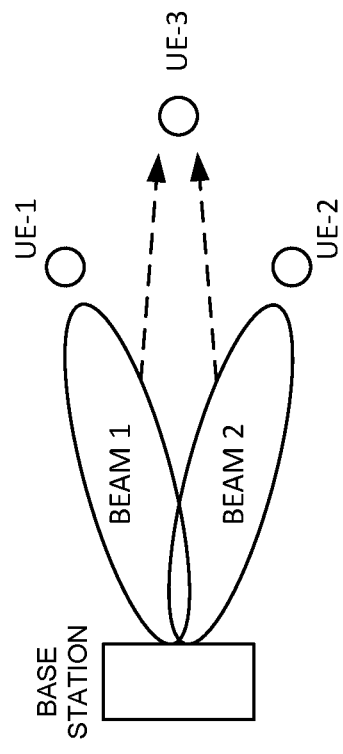

As shown in FIG. 4A, the precoder W for three UEs using two beams may be given by an equation below.

[Math. 7]

$$W = W_1 \times W_2 \times W_3 = \begin{bmatrix} a_1 & b_1 \\ a_2 & b_2 \\ & & a_1 & b_1 \\ & & a_2 & b_2 \end{bmatrix} \times \begin{bmatrix} 1 & 0 \\ 0 & 1 \\ \varphi^n 1 & \varphi^n 0 \\ \varphi^n 0 & \varphi^n 1 \end{bmatrix} \times \begin{bmatrix} \alpha_1 & 0 & \beta_1 \\ 0 & \alpha_2 & \beta_2 \end{bmatrix}$$ (Equation 7)

In $W_1$, the first column $a_i$ of the matrix B corresponds to the beam 1, and the second column $b_i$ of the matrix B corresponds to the beam 2. In $W_3$, $|\alpha_i|^2 + |\beta_i|^2 = 1$, 2, $\alpha_i, \beta_i \in \mathbb{C}$. $\alpha_1$ represents a coefficient for mapping the signal stream for the UE 1 to the beam 1. $\alpha_2$ represents a coefficient for mapping the signal stream for the UE 2 to the beam 2. $\beta_1$ represents a coefficient for mapping the signal stream for the UE 3 to the beam 1. $\beta_2$ represents a coefficient for mapping the signal stream for the UE 3 to the beam 2. In $W_3$, the UEs 1 and 2 (in the first and second columns) are associated with one coefficient (beam). In $W_3$, the UE 3 (in the third column) is associated with two coefficients (beams). Each of the UEs 1 and 2 receives the DMRS and data using one beam. The UE 3 receives the DMRS and data using two beams.

Example 2

As shown in FIG. 4B, the precoder W for three UEs using two beams may be given by an equation below.

[Math. 8]

$$W = W_1 \times W_2 \times W_3 = \begin{bmatrix} a_1 & b_1 & c_1 \\ a_2 & b_2 & c_2 \\ a_3 & b_3 & c_3 \\ & & & a_1 & b_1 & c_1 \\ & & & a_2 & b_2 & c_2 \\ & & & a_3 & b_3 & c_3 \end{bmatrix} \times$$ (Equation 8)

$$\begin{bmatrix} 1 & 0 & 0 \\ 0 & 1 & 0 \\ 0 & 0 & 1 \\ \varphi^n 1 & 0 & 0 \\ 0 & \varphi^n 1 & 0 \\ 0 & 0 & \varphi^n 1 \end{bmatrix} \times \begin{bmatrix} \alpha_1 & \beta_1 & \\ & \alpha_2 & \beta_2 & \gamma_2 \\ & & \alpha_3 & \beta_3 \end{bmatrix} =$$

$$\begin{bmatrix} a & b & c \\ \varphi a & \varphi b & \varphi c \end{bmatrix} \times \begin{bmatrix} \alpha_1 & \beta_1 & \\ & \alpha_2 & \beta_2 & \gamma_2 \\ & & \alpha_3 & \beta_3 \end{bmatrix}$$

$$\downarrow \qquad\qquad \downarrow$$
$$W_1 \times W_2 \qquad\qquad W_3$$

In $W_1$, the first column $a_i$ of the matrix B corresponds to the beam 1, the second column $b_i$ of the matrix B corresponds to the beam 2, and the third column $c_i$ of the matrix B corresponds to the beam 2. In $W_3$, $|\alpha_i|^2 + |\beta_i|^2 + |\gamma_i|^2 = 1$ and i=1, 2, 3, $\alpha_i, \beta_i, \gamma_i \in \mathbb{C}$. $\alpha_1$ represents a coefficient for mapping the signal stream for the UE 1 to the beam 1. $\beta_1$ represents a coefficient for mapping the signal stream for the UE 2 to the beam 1. $\alpha_2$ represents a coefficient for mapping the signal stream for the UE 2 to the beam 2. $\beta_2$ represents a coefficient for mapping the signal stream for the UE 3 to the beam 2. $\gamma_2$ represents a coefficient for mapping the signal stream for the UE 4 to the beam 2. $\alpha_3$ represents a coefficient for mapping the signal stream for the UE 4 to the beam 3. $\beta_3$ represents a coefficient for mapping the signal stream for the UE 5 to the beam 3. In W$_3$, the UEs 1, 3, and 5 (in the first, third, and fifth columns) are associated with one coefficient (beam). In W$_3$, the UEs 2 and 4 (in the second and fourth columns) are associated with two coefficients (beams). Each of the UEs 1, 3, and 5 receives the DMRS and data using one beam. Each of the UEs 2 and 4 receives the DMRS and data using two beams.

<<Transmission Procedure>>

Figure 5:
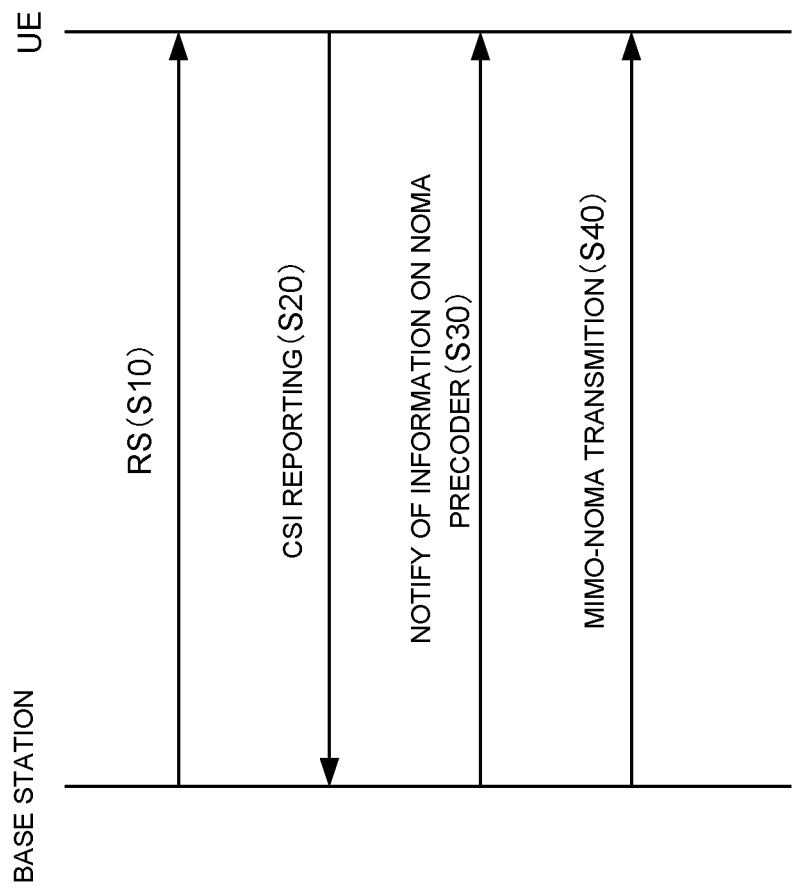
FIG. 5 is a diagram to show an example of a procedure of the proposed scheme.

The proposed scheme may comply with a procedure shown in FIG. 5, for example. The base station transmits an RS (such as SS/PBCH block and CSI-RS). The UE receives the RS to perform the channel estimation and the beam selection, based on the RS (S10). The UE feeds back a precoding matrix indicator (PMI) through channel state information (CSI) reporting (S20). The base station calculates a precoder in accordance with the PMI reported by the paired UEs, and notifies information relating to the precoder W$_3$ for data detection (S30). The UE establishes the precoder W$_3$, based on the information. The base station transmits a MIMO-NOMA signal (for example, data and PDSCH) (S40). The UE detects (demodulates) the data using the DMRS and the precoder W$_3$.

The UE may receive DMRS information (configuration information) relating to at least one resource of the DMRS (DMRS resource) through at least one of higher layer signaling and downlink control information. To the DMRS, a first precoder (MIMO precoder, for example, W$_1 \times$W$_2$) for a beam (MIMO) may be applied, and a second precoder (NOMA precoder, for example, W$_3$) for superposing (NOMA) a plurality of signals transmitted using the same beam may not be applied. The UE may demodulate a PDSCH (data) to which the first precoder and the second precoder are applied, based on the DMRS and information relating to the second precoder.

In a case that the DMRS information indicates more than one DMRS resource, the UE may demodulate the PDSCH by using more than one beam (more than one DMRS resource). In a case that the DMRS information indicates one DMRS resource, the UE may demodulate the PDSCH by using one beam (one DMRS resource).

The number of beams (based on the first precoder) generated by the base station may be smaller than the number of UEs receiving signals (based on the first precoder and the second precoder) multiplexed via the high-frequency MIMO-NOMA.

The UE may receive information for identifying the NOMA precoder W$_3$ through at least one of higher layer signaling and downlink control information.

The UE may receive information for identifying a size of the NOMA precoder W$_3$ (at least one of the number of columns and the number of rows, and the number of UEs multiplexed via the NOMA) through at least one of higher layer signaling and downlink control information.

The UE may receive information for identifying the UE number i (the column number of W$_3$) through at least one of higher layer signaling and downlink control information.

The UE may receive information for identifying whether or not the UE is a near UE through at least one of higher layer signaling and downlink control information.

Configuration information indicating association between the DMRS resource (DMRS resource ID) and the UE number (column number of W$_3$) i may be notified to the UE through at least one of higher layer signaling and downlink control information, or defined by the specifications. The UE may identify the UE number, based on the configured DMRS resource association and the DMRS resource ID.

Each of a plurality of UEs receiving one beam may be specified as any one of a near UE and a far UE. The near UE may be a UE receiving one beam (DMRS), and the far UE may be a UE receiving more than one beam (DMRS). The near UE may be a UE receiving more than one beam (DMRS), and the far UE may be a UE receiving one beam (DMRS).

The far UE may receive information relating to a column of W$_3$ corresponding to the UE through at least one of higher layer signaling and downlink control information. The near UE may receive information relating to a column of W$_3$ corresponding to the UE and a column of W$_3$ corresponding to a far UE paired with the UE, through at least one of higher layer signaling and downlink control information.

The near UE may remove a signal to the far UE from the received signal by using successive interference cancellation (SIC) to obtain a signal to the near UE.

According to the embodiment, the number of UEs to be accommodated can be increased without increasing the number of DMRS ports for the existing MIMO.

Second Embodiment

In receiving information of the non-orthogonal multiple access (NOMA) precoder W$_3$, the UE may use an advanced detection method (for example, successive interference canceler (Successive Interference Cancellation (SIC)). Therefore, each of a plurality of UEs is required to recognize NOMA precoders of other interfering NOMA UEs.

In a second embodiment, a method for the UE to receive the information relating to the NOMA precoder W$_3$ for data detection will be described. Specifically, in the second embodiment, a method for specifying the NOMA precoder and a method for specifying the NOMA precoder through signaling are defined.

Embodiment 2-1

The UE may be explicitly notified of information relating to the elements of the NOMA precoder W$_3$ from a network. For example, the UE may determine the elements of the NOMA precoder W$_3$ in accordance with methods 2-1-1 to 2-1-3 described below.

Here, the element of W$_3$ may be expressed by a complex number A+jB (A represents a real part, B represents an imaginary part, and j represents an imaginary unit), or by a complex number $\rho e^{j\theta}$ ($\rho$ represents a magnitude and $\theta$ represents a phase). Note that the imaginary unit j may be an imaginary unit i. Here, each of A and B of A+jB, and $\rho$ and $\theta$ of complex number $\rho e^{j\theta}$ may be replaced by D. D may be normalized to be in a numerical range (for example, $r_0 \leq D \leq r_{2^N}$). Here, N may represent a quantization bit rate obtained after A, B, $\rho$, and $\theta$ are quantized. D may be quantized using (Equation 9) below.

[Math. 9]

$$f(D) = \begin{cases} a_{N-1}a_{N-2} \ldots a_1a_0 & (r_0 \leq D \leq r_1) \\ b_{N-1}b_{N-2} \ldots b_1b_0 & (r_1 < D \leq r_2) \\ \ldots & \\ y_{N-1}y_{N-2} \ldots y_1y_0 & (r_{2^N-2} < D \leq r_{2^N-1}) \\ z_{N-1}z_{N-2} \ldots z_1z_0 & (r_{2^N-1} < D \leq r_{2^N}) \end{cases} \quad \text{(Equation 9)}$$

Here, $a_{N-1}a_{N-2} \ldots a_1a_0$, $b_{N-1}b_{N-2} \ldots b_1b_0$, $\ldots$, $y_{N-1}y_{N-2} \ldots y_1y_0$, $z_{N-1}z_{N-2} \ldots z_1z_0$ may be quantized bits. Note that the quantized bits may be referred to as quantization bits.

In (Equation 9) above, a case of $r_{k+1}-r_k=r_{m+1}-r_m$ (k and m are any integers satisfying k being not equal to m) is expressed, in the present disclosure, as "quantizing in a uniform numerical width," and a case of $r_{k+1}-r_k$ being not equal to $r_{m+1}-r_m$ (k and m are any integers satisfying k being not equal to m) is expressed, in the present disclosure, as "quantizing in a non-uniform numerical width."

(Method 2-1-1)

The network may quantize complex number values of the NOMA precoder $W_3$, based on a certain rule. The rule may be, for example, quantizing the element A+jB of the NOMA precoder $W_3$ (A represents a real part, B represents an imaginary part, and j represents an imaginary unit) in a uniform numerical width to quantization bits having a certain number of bits.

The number of bits of each of the elements of $W_3$ may be M bits. M may be determined based on a quantization bit rate N obtained after A, B, ρ, and θ are quantized. M and N may satisfy M=2N.

Figure 6:
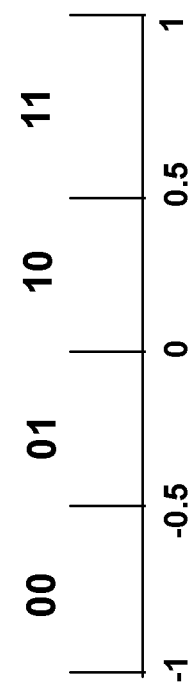
FIG. 6 is a diagram to show an example of quantization of a NOMA precoder $W_3$.

FIG. 6 shows an example of the rule for quantization in a case that the number of bits of each element of $W_3$ is four. For example, regarding an element A+jB of $W_3$ (A represents a real part and B represents an imaginary part), it is assumed that in a case that A or B satisfies −1≤A or B≤−0.5, quantization bits are "00." It is assumed that in a case that A or B satisfies −0.5<A or B≤0, quantization bits are "01." It is assumed that in a case that 0<A or B≤0.5, quantization bits are "10." It is assumed that in a case that A or B satisfies 0.5<A or B≤1, quantization bits are "11." The element A+jB of the NOMA precoder $W_3$ is quantized assuming that the quantization bits for A are higher two digits and the quantization bits for B are lower two digits. Note that numerical values in FIG. 6 are merely examples without limitation.

In addition, the certain rule may be, for example, quantizing the element A+jB of the NOMA precoder $W_3$ (A represents a real part and B represents an imaginary part) in a non-uniform numerical width to quantization bits having a certain number of bits.

Figure 7:
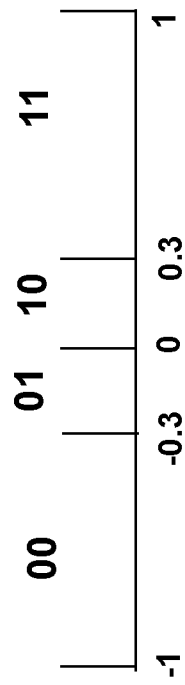
FIG. 7 is a diagram to show an example of the quantization of the NOMA precoder $W_3$.

FIG. 7 shows an example of the rule for quantization in a case that the number of bits of each element of $W_3$ is four. For example, regarding an element A+jB of $W_3$ (A represents a real part and B represents an imaginary part), it is assumed that in a case that A or B satisfies −1≤A or B≤−0.3, quantization bits are "00." It is assumed that in a case that A or B satisfies −0.3<A or B≤0, quantization bits are "01." It is assumed that in a case that 0<A or B≤0.3, quantization bits are "10." It is assumed that in a case that A or B satisfies 0.3<A or B≤1, quantization bits are "11." The element A+jB of the NOMA precoder $W_3$ is quantized assuming that the quantization bits for A are higher two digits and the quantization bits for B are lower two digits. Note that numerical values in FIG. 7 are merely examples without limitation.

The certain rule may be, for example, quantizing the element $\rho e^{j\theta}$ of the NOMA precoder $W_3$ (ρ represents a magnitude and θ represents a phase) in a uniform numerical width to quantization bits having a certain number of bits.

Figure 8:
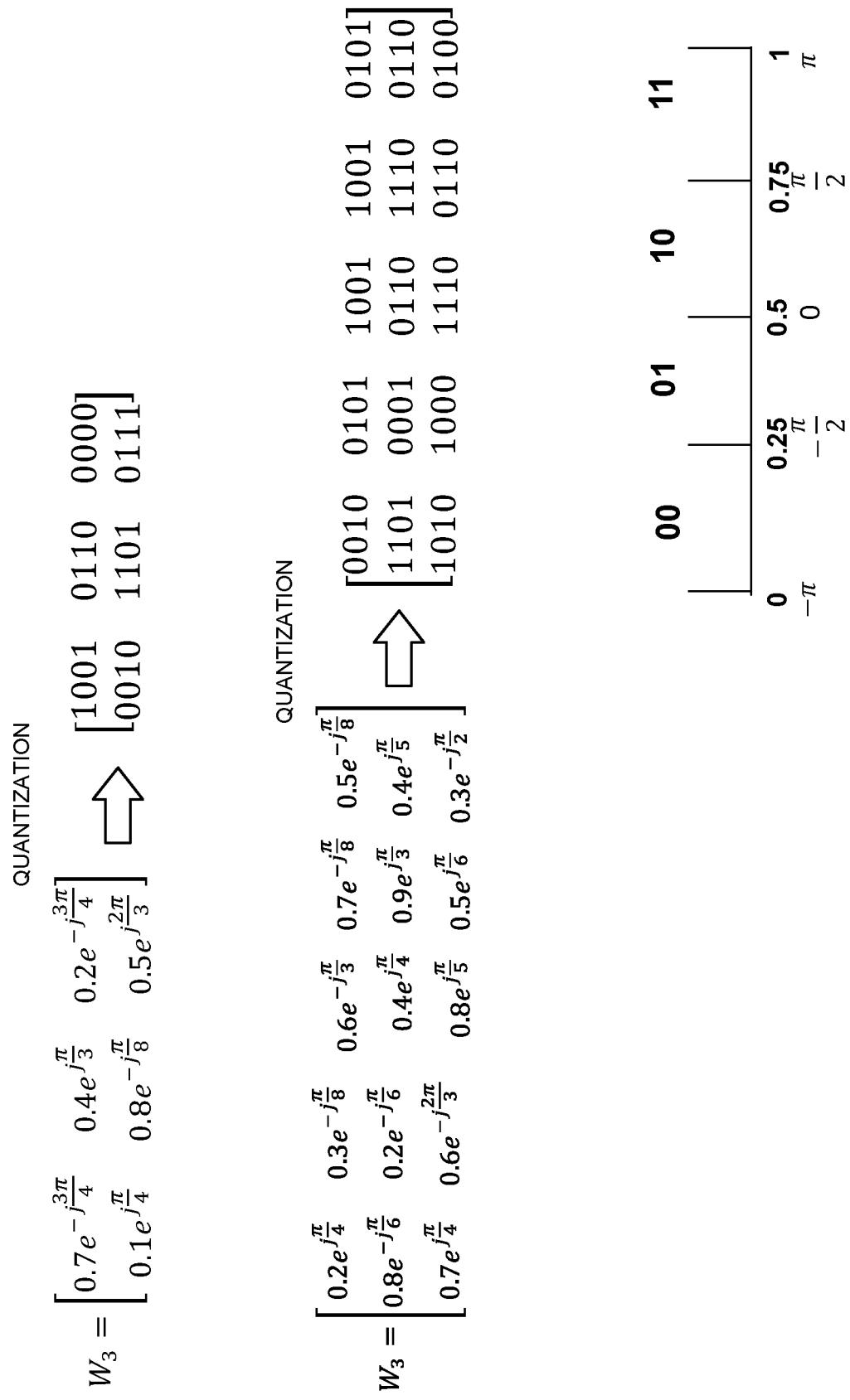
FIG. 8 is a diagram to show an example of the quantization of the NOMA precoder $W_3$.

FIG. 8 shows an example of the rule for quantization in a case that the number of bits of each element of $W_3$ is four. For example, regarding an element $\rho e^{j\theta}$ of $W_3$ (ρ represents a magnitude and θ represents a phase), it is assumed that in a case that ρ satisfies 0≤ρ≤0.25, quantization bits for ρ are "00," in a case that ρ satisfies 0.25<ρ≤0.5, quantization bits for ρ are "01," in a case that ρ satisfies 0.5<ρ≤0.75, quantization bits for ρ are "10," and in a case that ρ satisfies 0.75<ρ≤1, quantization bits for ρ are "11." It is assumed that in a case that θ satisfies −π≤θ≤−0.5π, quantization bits for θ are "00," in a case that θ satisfies −0.5π<θ≤0, quantization bits for θ are "01," in a case that θ satisfies 0<θ≤0.5π, quantization bits for θ are "10," and in a case that θ satisfies 0.5π<θ≤π, quantization bits for θ are "11." The element $\rho e^{j\theta}$ of the NOMA precoder $W_3$ is quantized assuming that the quantization bits for ρ are higher two digits and the quantization bits for θ are lower two digits. Note that numerical values in FIG. 8 are merely examples without limitation.

The certain rule may be, for example, quantizing the element $\rho e^{j\theta}$ of the NOMA precoder $W_3$ (ρ represents a magnitude and θ represents a phase) in a non-uniform numerical width to quantization bits having a certain number of bits.

Figure 9:
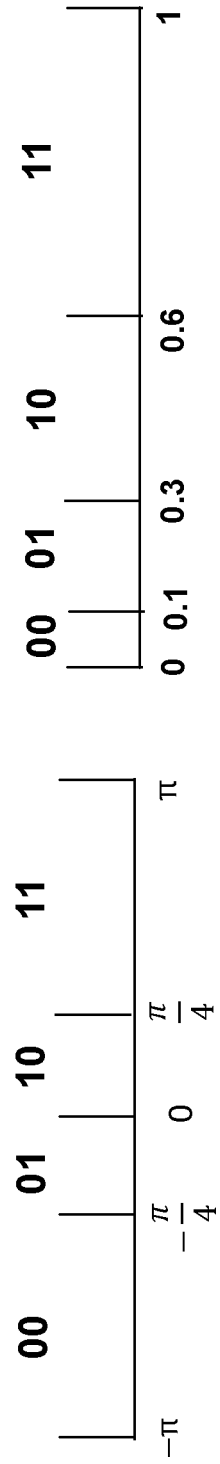
FIG. 9 is a diagram to show an example of the quantization of the NOMA precoder $W_3$.

FIG. 9 shows an example of the rule for quantization in a case that the number of bits of each element of $W_3$ is four. For example, regarding an element $\rho e^{j\theta}$ of $W_3$ (ρ represents a magnitude and θ represents a phase), it is assumed that in a case that ρ satisfies 0≤ρ≤0.1, quantization bits for ρ are "00," in a case that ρ satisfies 0.1<ρ≤0.3, quantization bits for ρ are "01," in a case that ρ satisfies 0.3<ρ≤0.6, quantization bits for ρ are "10," and in a case that ρ satisfies 0.6<ρ≤1, quantization bits for ρ are "11." It is assumed that in a case that θ satisfies −π≤θ≤−0.25π, quantization bits for θ are "00," in a case that θ satisfies −0.25π<θ≤0, quantization bits for θ are "01," in a case that θ satisfies 0<θ≤0.25π, quantization bits for θ are "10," and in a case that θ satisfies 0.25π<θ≤π, quantization bits for θ are "11." The element $\rho e^{j\theta}$ of the NOMA precoder $W_3$ is quantized assuming that the quantization bits for ρ are higher two digits and the quantization bits for θ are lower two digits. Note that numerical values in FIG. 9 are merely examples without limitation.

(Method 2-1-2)

The UE may receive a quantized bit sequence to reconstruct the NOMA precoder $W_3$, based on at least one of a quantization function and a quantization criterion.

The network (for example, base station) and the UE may recognize at least one of the number of bits of the element of NOMA precoder $W_3$ after the quantization (for example, the number of bits is M), the number of beams (for example, $N_{beams}$), the number of NOMA UEs (for example, K), the quantization function, and the quantization criterion. In other words, at least one of these may be predefined, and a common recognition thereof may be used between the network and the UE.

The network may deform $W_3$ after the quantization into a bit sequence. As a method for deforming $W_3$, for example, $W_3$ may be deformed by using the n-th column of $W_3$ (n=1, 2, 3, as the n-th bit sequence part.

In the method for deforming $W_3$, specifically, in a case that $N_{beams}=2$, K=3, and M=4, and $W_3$ after the quantization is

[Math. 10]

$$\begin{bmatrix} 1111 & 0011 & 1000 \\ 0110 & 1111 & 0011 \end{bmatrix}$$

it is assumed that the first column of $W_3$

[Math. 11]

$$\begin{bmatrix} 1111 \\ 0110 \end{bmatrix}$$

is a first bit sequence part, the second column of $W_3$

[Math. 12]
$$\begin{bmatrix} 0011 \\ 1111 \end{bmatrix}$$

is a second bit sequence part, and the third column of $W_3$

[Math. 13]
$$\begin{bmatrix} 1000 \\ 0011 \end{bmatrix}$$

is a third bit sequence part, and then, $W_3$ may be deformed. In this case, the bit sequence obtained through the deformation of $W_3$ may be [111101100011111110000011].

The UE may reconstruct $W_3$, based on at least one of the number of bits of the element of NOMA precoder $W_3$ after the quantization (for example, the number of bits is M) and the number of UEs (for example, K) to recover $W_3$, based on the quantization criterion.

The reconstructing of $W_3$ may be, for example, in a state where the UE recognizes the number of bits of each element of the NOMA precoder $W_3$ after the quantization (for example, M) and the number of beams (for example, $N_{beams}$), sequentially setting first ($N_{beams} \times M$) values of the bit sequence as the first column of $W_3$, next ($N_{beams} \times M$) values of the bit sequence as the second column of $W_3$, and so on, and then, finally setting last ($N_{beams} \times M$) values of the bit sequence as the last column of $W_3$.

The recovering of $W_3$ may be, for example, the UE recovering $W_3$, based on a quantization criterion. The quantization criterion may be a function $R(X)$. The function $R(X)$ may be (Equation 10) below, for example.

[Math. 14]
$$R(X) = \begin{cases} \dfrac{r_0 + r_1}{2} & (X = a_{N-1}a_{N-2} \ldots a_1 a_0) \\ \dfrac{r_1 + r_2}{2} & (X = b_{N-1}b_{N-2} \ldots b_1 b_0) \\ \ldots & \ldots \\ \dfrac{r_{2N-2} + r_{2N-1}}{2} & (X = y_{N-1}y_{N-2} \ldots y_1 y_0) \\ \dfrac{r_{2N-1} + r_{2N}}{2} & (X = z_{N-1}z_{N-2} \ldots z_1 z_0) \end{cases} \quad \text{(Equation 10)}$$

A specific example of the UE reconstructing (recovering) $W_3$ is shown. In this example, it is assumed that the UE receives a bit sequence [111101100011111110000011] corresponding to the deformed $W_3$. It is assumed that the UE recognizes $N_{beams}=2$ and M=4. In this case, the UE sets first ($N_{beams} \times M$) values of the bit sequence, that is, eight values (11110110) as the first column of $W_3$, next eight values (00111111) of the bit sequence as the second column of $W_3$, and last eight values (10000011) of the bit sequence as the third column of $W_3$ to reconstruct as below:

[Math. 15]
$$\begin{bmatrix} 1111 & 0011 & 1000 \\ 0110 & 1111 & 0011 \end{bmatrix}$$

Assume a case that the network notifies the UE that a specific column of $W_3$ (for example, the first column) indicates the NOMA precoder for the UE, and the UE recognizes that the quantization function f(D) for the element A+jB is as below:

[Math. 16]
$$f(D) = \begin{cases} 00 & (-1 \le D \le -0.5) \\ 01 & (-0.5 < D \le -0) \\ 10 & (0 < D \le 0.5) \\ 11 & (0.5 < D \le 1) \end{cases}$$

At this time, the UE recovers $W_3$, based on the function $R(X)$ that is the quantization criterion as below:

[Math. 17]
$$R(X) = \begin{cases} -0.75 & (X = 00) \\ -0.25 & (X = 01) \\ 0.25 & (X = 10) \\ 0.75 & (X = 11) \end{cases}$$

As a result, $W_3$ is recovered as below:

[Math. 18]
$$\begin{bmatrix} 0.75 + 0.75j & -0.75 + 0.75j & 0.25 - 0.75j \\ -0.25 + 0.25j & 0.75 + 0.75j & -0.75 + 0.75j \end{bmatrix}$$

Note that the quantization function f(D) and the function R(B) as the quantization criterion in the present disclosure are merely examples without limitation.
(Method 2-1-3)

The UE may receive the information relating to at least one of the number of bits of the element of NOMA precoder $W_3$ after the quantization (for example, the number of bits is M), the number of beams (for example, $N_{beams}$), and the quantized bit sequence of the NOMA precoder, through at least one of higher layer signaling (for example, at least one of RRC signaling and MAC CE) and physical layer signaling (for example, downlink control information (DCI)).

The UE may be notified of the number of NOMA UEs (for example, K) implicitly by way of at least one of the number of bits of the element of NOMA precoder $W_3$ after the quantization (for example, the number of bits is M), the number of beams (for example, $N_{beams}$), and the quantized bit sequence of the NOMA precoder, or explicitly through at least one of higher layer signaling (for example, at least one of RRC signaling and MAC CE) and physical layer signaling (for example, downlink control information (DCI)).

In a case that higher layer parameters enabling the NOMA that utilizes the MIMO technique (which may be referred to as, for example, "combination of MIMO and NOMA") are configured, a field of n bits (for example, n=4) indicating the NOMA precoder $W_3$ may be newly added to downlink control information (for example, DCI format 1_1), for example.

As described above, according to Embodiment 2-1, more accurate preferable communication is possible depending on the number of bits of the element of NOMA precoder $W_3$ after quantization.

Embodiment 2-2

A correspondence relation (for example, table) for a new codebook (or contents in the codebook) of the NOMA precoder $W_3$ is defined, and a value included in the correspondence relation (for example, index) is notified to the UE, thereby, the UE may recognize the element of the NOMA precoder $W_3$. The correspondence relation may be predefined by the specifications, or notified from the network to the UE through at least one of higher layer signaling and physical layer signaling. For example, the UE may determine the correspondence relation in accordance with methods 2-2-1 to 2-2-3 described below.

(Method 2-2-1)

Figure 10:
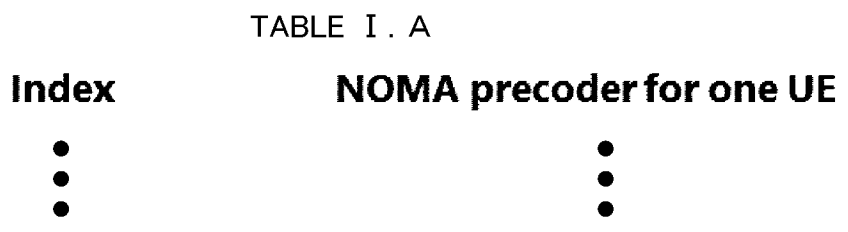

A correspondence relation for a plurality of NOMA precoders with respect to a NOMA UE may be those indicating the NOMA precoder with respect to one UE. For example, the correspondence relation may be a correspondence relation including two columns (table. A) as shown in FIG. 10. In FIG. 10, the first column indicates indices, and the second column indicates the NOMA precoders for one UE. Note that in the present disclosure, the "precoder" may be interpreted as a codeword, a property (also referred to as a signature) for separating a signal, or the like.

Each of a plurality of UEs may receive an index of the NOMA precoder used by the UE itself, and additionally, in a case that other interfering UEs exist, may individually receive indices of NOMA precoders used by the other UEs.

The indices of K NOMA precoders for the number of NOMA UEs (for example, K) may be notified to the UE through at least one of higher layer signaling (for example, at least one of RRC signaling and MAC CE) and physical layer signaling (for example, downlink control information (DCI)).

The number of NOMA UEs (for example, K) may be explicitly notified to the UE through at least one of higher layer signaling (for example, at least one of RRC signaling and MAC CE) and physical layer signaling (for example, downlink control information (DCI)), or may be implicitly recognized by the UE by way of the number of received indices of the NOMA precoders.

The UE, after receiving the index of the NOMA precoder for the UE itself and the indices of the NOMA precoders for other interfering UEs, can reconstruct a sub-matrix of $W_3$ for data detection.

To be more specific, a description is given assuming a case that three UEs exist as shown in FIG. 11. In FIG. 11, a UE-3 is positioned at the cell edge, and this position is less affected by beams directed to a UE-1 and a UE-2, whereas according to the principle of the NOMA, the UE-3 is at a position that requires larger power. Accordingly, because the UE-3 can consider signals directed to the UE-1 and the UE-2 as noises, the UE-3 can preferably receive (for example, demodulate, decode) signals directed to the UE terminal itself so long as the UE-3 can know the precoder for the UE itself. However, the UE-1 and the UE-2 are strongly interfered by the UE-3, and thus, it is necessary to obtain the information of the precoder for the UE-3 to cancel the interference of the signals to the UE-3.

In FIG. 11, the network applies $W_{3,16}^{I.A}$, $W_{3,17}^{I.A}$, and $W_{3,0}^{I.A}$ to signals directed to the UE-1, the UE-2, and the UE-3, respectively, and transmits the signals. $W_{3,16}^{I.A}$ corresponds to the index of 16 of the NOMA precoder in a table I.A, $W_{3,17}^{I.A}$ corresponds to the index of 17 of the NOMA precoder in the table I.A, and $W_{3,0}^{I.A}$ corresponds to the index of 0 of the NOMA precoder in the table I.A. Hereinafter, in the present disclosure, $W_{3,s}^{t}$ refers to an index s in a table t for a NOMA precoder ($W_3$).

Each UE receives the index of the NOMA precoder used by the UE itself (in other words, for the UE terminal itself), and additionally, in a case that there exist the indices of the NOMA precoders directed to other interfering UEs (or for other UEs), receives the indices of the NOMA precoders used by the other UEs.

In the present disclosure, the precoder for the UE terminal itself may be interchangeably interpreted as a useful precoder, a desired precoder, and the like. The precoders for other UEs may be referred as interfering precoders for the other UEs, undesired precoders, and the like.

Note that hereinafter the index s corresponding to an index of a useful precoder is also simply expressed as the useful precoder index s. The indices s corresponding to indices of interfering precoders for other UEs are also simply expressed as interfering precoders indices s for other UEs.

For example, the UE-1 receives the useful precoder index of 16 and the interfering precoder index of 0 for the UE-3. Similarly, the UE-2 receives the useful precoder index of 17 and the interfering precoder index of 0 for the UE-3. The UE-3 receives the useful precoder index of 0.

The UE (for example, the UE-1 and the UE-2 described above), in a case of receiving a plurality of indices (or deriving a plurality of indices from the received information), may assume that a specific index (for example, the first index) of the plurality of indices is the useful precoder index, and the rest of the indices are the interfering precoder indices.

Each of the UE-1 to the UE-3 can reconstruct a sub-matrix of the NOMA precoder $W_3$ to perform interference cancellation and advanced data detection (the sub-matrix includes the useful precoder and the interfering precoders (if any)), based on the individually received indices of the NOMA precoders.

Note that the method 2-2-1 describes the case that two beams are used for three UEs, but the number of UEs and the number of beams are not limited thereto.

According to the method 2-2-1, for example, the number of combinations of the numbers of NOMA precoders can be increased, and thus, flexible control is possible. An amount of information required for notification of the useful precoder, the interfering precoder, and the like can be preferably reduced.

(Method 2-2-2)

A correspondence relation for a plurality of NOMA precoders with respect to a NOMA UE may be those indicating the NOMA precoder with respect to two or more UEs (for example, all UEs as targets of the NOMA). For example, for the correspondence relation, different correspondence relations may be defined for different numbers of UEs (tables II.A-1 to A-4) as shown in FIGS. 12A to 12D. The correspondence relation may be a correspondence relation including two columns.

In FIG. 12A, the first column indicates indices, and the second column indicates the NOMA precoder matrices for two UEs. In FIG. 12B, the first column indicates indices, and the second column indicates the NOMA precoder matrices for three UEs. In FIG. 12C, the first column indicates indices, and the second column indicates the NOMA precoder matrices for four UEs. In FIG. 12D, the first column indicates indices, and the second column indicates the NOMA precoder matrices for five UEs.

A plurality of UEs may receive in common information relating to the NOMA precoder matrices used by all of the plurality of UEs. For example, the number of NOMA UEs, table indices used by the plurality of UEs, and the indices of the NOMA precoder matrices used by all of the plurality of UEs may be received in common. In addition, each UE may individually receive information relating to a position of the useful precoder (which may be also referred to as a useful precoder index, for example). The useful precoder index may be information indicating to which column number in the specified NOMA precoder matrix the useful precoder corresponds.

Note that the table index is an index used to identify the table, and may be interchangeably interpreted as an index of a precoder or precoder matrix, an index of a NOMA type, and the like. In the case in FIGS. 12A to 12D, the respective table indices may be 1, 2, 3, and 4.

The UE not notified of the table index may identify a table to use, based on the number of NOMA UEs. For example, the UE notified of the number of NOMA UEs=2 can identify that the table to use is that in FIG. 12A even in the case of being not notified of the table index.

The index of the NOMA precoder, the number of NOMA UEs (for example, K), the table index, the useful precoder index, and the like may be notified to the UE through at least one of higher layer signaling (for example, at least one of RRC signaling and MAC CE) and physical layer signaling (for example, downlink control information (DCI)).

A plurality of UEs can reconstruct $W_3$ for data detection by receiving in common the indices of the NOMA precoder matrices used by all of the plurality of UEs.

Figure 13:
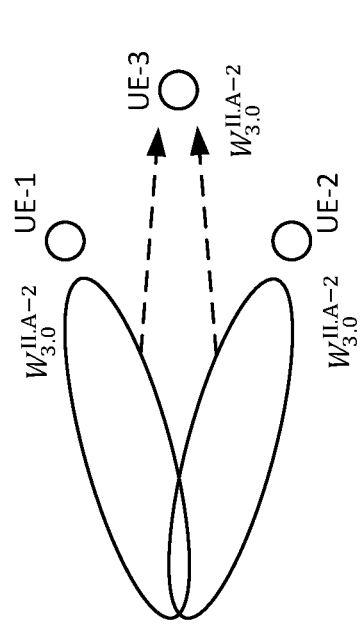
FIG. 13 a diagram to show an example of a UE positional relation and a correspondence relation for a plurality of NOMA precoders with respect to a NOMA UE.

To be more specific, a description is given assuming a case that three UEs exist as shown in FIG. 13. Locations of the UE-1 to UE-3 in FIG. 13 are the same as those in FIG. 11.

In FIG. 13, the network applies $W_{3,0}^{II.A-2}$ to each of signals directed to the UE-1, the UE-2, and the UE-3, and transmits the signals.

In FIG. 13, the UE-1 receives the index of 0 of the NOMA precoder matrix, the table index of 2, and the useful precoder index of 1. Similarly, the UE-2 receives the index of 0 of the NOMA precoder matrix, the table index of 2, and the useful precoder index of 2. The UE-3 receives the index of 0 of the NOMA precoder matrix, the table index of 2, and the useful precoder index of 3.

Note that the useful precoder may refer to a user-specific NOMA precoder required for data detection.

Each of the UE-1 to the UE-3 can use the NOMA precoder $W_3$ to perform interference cancellation and advanced data detection, based on the received index of the NOMA precoder, table index, and the useful precoder index.

Note that the method 2-2-2 describes the case that two beams are used for three UEs, but the number of UEs and the number of beams are not limited thereto.

According to the method 2-2-2, an amount of the information relating to the NOMA precoder used by each UE can be reduced to suppress the overhead increase.

(Method 2-2-3)

In the method 2-2-3, a method in combination of the method 2-2-1 and the method 2-2-2 described above will be described. A correspondence relation for a plurality of NOMA precoders with respect to a NOMA UE may be those indicating the NOMA precoder with respect one or more UE. For example, for the correspondence relation, different correspondence relations may be defined for different numbers of UEs (tables III.A-1 to A-4) as shown in FIGS. 14A to 14D. The correspondence relation may be a correspondence relation including two columns.

In FIG. 14A, the first column indicates indices, and the second column indicates the NOMA precoders for one UE. In FIG. 14B, the first column indicates indices, and the second column indicates the NOMA precoder matrices for two UEs. In FIG. 14C, the first column indicates indices, and the second column indicates the NOMA precoder matrices for three UEs. In FIG. 14D, the first column indicates indices, and the second column indicates the NOMA precoder matrices for four UEs.

The correspondence relation including the NOMA precoder for one UE (for example, FIG. 14A) may be a correspondence relation for a UE not requiring (or not performing) interference cancellation. The correspondence relation including the NOMA precoder for two or more UEs (for example, FIGS. 14B to 14D) may be a correspondence relation for a UE requiring cancellation of the interferences of other UEs.

The UE, of a plurality of UEs, not requiring (or not performing) interference cancellation may receive, separately from other UEs, the information relating to the correspondence relation for the NOMA precoder to use (for example, the number of NOMA UEs, the table index) and the index of the NOMA precoder.

Each UE, of a plurality of UEs, requiring cancellation of the interferences of other UEs may individually receive the information relating to the correspondence relation for the NOMA precoder matrix to use (for example, the number of NOMA UEs, the table index) and the information relating to the position of the useful precoder (for example, the useful precoder index described above in the method 2-2-2).

The UE requiring cancellation of the interferences of other UEs may assume that a specific column (for example, the first column) in the specified NOMA precoder matrix is the useful precoder, even in a case of not receiving the above useful precoder index.

The index of the NOMA precoder, the number of NOMA UEs (for example, K, the table index), the useful precoder index, and the like may be notified to the UE through at least one of higher layer signaling (for example, at least one of RRC signaling and MAC CE) and physical layer signaling (for example, downlink control information (DCI)).

The UE, after acquiring the NOMA precoder for the UE itself and the NOMA precoders for other interfering UEs (if any), can reconstruct a sub-matrix of $W_3$ for data detection.

Figure 15:
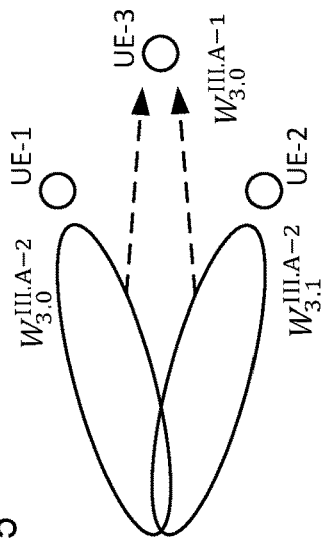
FIG. 15 a diagram to show an example of a UE positional relation and a correspondence relation for a plurality of NOMA precoders with respect to a NOMA UE.

To be more specific, a description is given assuming a case that three UEs exist as shown in FIG. 15. Locations of the UE-1 to UE-3 in FIG. 15 are the same as those in FIG. 11.

In FIG. 15, the table III.A-1 may be of a correspondence relation for a UE that is poor in the channel state and so requires high power (for example, the UE-3). On the other hand, the table III.A-2 may be of a correspondence relation for a UE that is excellent in the channel state and so does not require high power (for example, the UE-1 or the UE-2).

In FIG. 15, the network applies (part of) $W_{3,0}^{III.A-2}$, (part of) $W_{3,1}^{III.A-2}$, and $W_{3,0}^{III.A-1}$ to respective signals directed to the UE-1, the UE-2, and the UE-3, and transmits the signals.

In FIG. 15, the UE-1 may receive the index of 0 of the NOMA precoder matrix, the table index of 2, and the useful precoder index of 1. Similarly, the UE-2 may receive the index of 1 of the NOMA precoder matrix, the table index of 2, and the useful precoder index of 1. The UE-3 may receive the index of 0 of the NOMA precoder used by itself (useful precoder) and the table index of 1.

Each of the UE-1 and the UE-2 can use the NOMA precoder $W_3$ to perform interference cancellation and advanced data detection, based on the received index of the NOMA precoder matrix, table index, and useful precoder index.

The UE-3 can reconstruct the sub-matrix of the NOMA precoder $W_3$ to perform interference cancellation and advanced data detection, based on the received index of the NOMA precoder and table index.

Note that the method 2-2-3 describes the case that two beams are used for three UEs, but the number of UEs and the number of beams are not limited thereto.

According to the method 2-2-3, the flexible control is possible, while the overhead can be reduced.

Third Embodiment

In Rel. 15 NR, the UE determines a modulation order ($Q_m$) for a scheduled PDSCH, a target coding rate, a spectral efficiency, and the like to perform reception processing, based on an MCS index notified by way of the DCI (for example, DCI formats 1_0, 1_1).

In order to achieve further performance improvement in the case that the NOMA is used, it is preferable that the MCS and the NOMA precoder be jointly designed and selected.

In the third embodiment, defined is a correspondence relation between the MCS index, and information of the MCS related parameter (at least one of the modulation order, the target coding rate, and the spectral efficiency) and the NOMA precoder (at least one of the useful precoder and the interfering precoder).

The correspondence relation may be referred to as an MCS table, an MCSP (MCS+precoder) table, or the like (hereinafter, simply referred to as an MCS table). The MCS index in the present disclosure may be referred to as an MCSP (MCS+precoder) index, or the like (hereinafter, simply referred to as the MCS index). Note that the MCS related parameter may be referred to as an MCS parameter.

The UE may recognize one or a plurality of elements (or one or a plurality of columns) of the NOMA precoder $W_3$, based on the received MCS index and MCS table.

Note that a value of each parameter, precoder, and the like in the MCS table may be predefined in the specifications, or notified to the UE from the network through higher layer signaling, physical layer signaling, or a combination of these.

For example, the MCS table may be defined in accordance with methods 3-1-1 to 3-1-3 described below.

In the present disclosure, the MCS parameter for the UE terminal itself may be interchangeably interpreted as a useful MCS parameter, a desired MCS parameter, and the like. The MCS parameters for other UEs may be referred to as interfering MCS parameters for the other UEs, undesired MCS parameters, and the like.

Hereinafter, the MCS parameter, the useful MCS parameter, and the interfering MCS parameter may be referred to as the MCS, the useful MCS, the interfering MCS, respectively. The useful MCS and the useful precoder are also referred to as the useful MCSP (MCS+P), and the interfering MCS and the interfering precoder are also referred to as the interfering MCSP (MCS+P).

In order to achieve the aim of the further performance improvement described above, it is preferable to secure fairness between the UEs and widen a coverage. In this case, as for the cell edge UE, it is preferable to perform control to provide the services using a plurality of beams, allocate larger power, and schedule using the smaller MCS.

For example, the NOMA precoder [sqrt(0.8)$e^{j\pi/8}$ sqrt(0.8) $e^{j\pi/8}]^T$ (where, sqrt(x) represents a square root of x, and T represents a transposed matrix, and the same applies to the following) preferably occupies more beams and larger power than the NOMA precoder [sqrt(0.2)$e^{j\pi/8}$ 0]$^T$. For this reason, it is desired that the former precoder is combined with a relatively low MCS (for example, MCS index=0), and the latter precoder is combined with a relatively high MCS (for example, MCS index=16).

Each MCS table in the third embodiment may be constructed such that the relatively low MCS index expected to be likely to be applied to the cell edge (or farther) UE is associated with a precoder corresponding to more beams (for example, a precoder with the smaller number of elements having a value of '0'), and the relatively high MCS index expected to be likely to be applied to the cell center (or nearer) UE is associated with a precoder corresponding to less beams (for example, a precoder with a larger number of elements having a value of '0').

Note that hereinafter, the index s corresponding to an index of a useful MCSP is also simply expressed as the useful MCSP index s. Additionally, the indices s corresponding to indices of interfering MCSPs for other UEs are also simply expressed as the interfering MCSPs indices s for other UEs.

(Method 3-1-1)

One MCS table may define the MCS related parameter and the NOMA precoder for one UE of a plurality of NOMA UEs.

FIG. 16 is a diagram to show an example of the MCS table according to the method 3-1-1. The MCS table may be a table including the first column corresponding to the MCS index, the second column set indicating the MCS for one UE, and the third column indicating the NOMA precoders for one UE (for example, expressed as a table I.B).

The NOMA UE requiring interference cancellation may receive the MCS index corresponding to the useful MCSP and the MCS index corresponding to the interfering MCSP. In other words, the network may notify the UE requiring interference cancellation of a plurality of MCS indices.

The NOMA UE not requiring interference cancellation may receive the MCS index corresponding to the useful MCSP. In other words, the network may notify the UE not requiring interference cancellation of one MCS index.

K MCS indices for the number of NOMA UEs (for example, K) may be notified to the UE through at least one of higher layer signaling (for example, at least one of RRC signaling and MAC CE) and physical layer signaling (for example, downlink control information (DCI)).

The number of NOMA UEs (for example, K) may be explicitly notified to the UE through at least one of higher layer signaling (for example, at least one of RRC signaling and MAC CE) and physical layer signaling (for example, downlink control information (DCI)), or may be implicitly recognized by the UE by way of the number of received MCS indices.

The UE, once receiving the MCS index of the useful MCSP (and the MCS indices of the interfering MCSPs, as needed), can reconstruct a sub-matrix of $W_3$ for data detection and recognize the MCS for reception.

Figure 17:
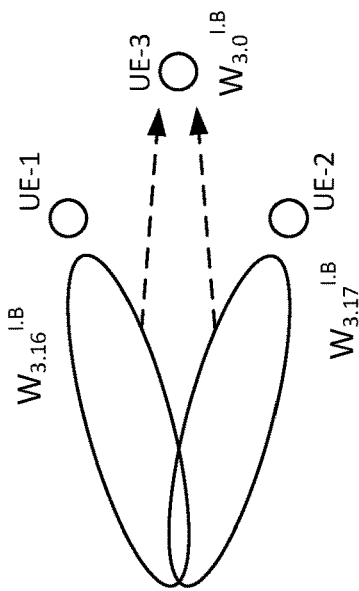
FIG. 17 is a diagram to show examples of a UE positional relation and an MCS table.

To be more specific, a description is given assuming a case that three UEs exist as shown in FIG. 17. An environment of each UE in FIG. 17 is the same as in FIG. 11, and thus, the duplicated description is not repeated.

In FIG. 17, the network applies $W_{3.16}^{I.B}$, $w_{3.17}^{I.B}$, and $W_{3.0}^{I.B}$ to signals directed to the UE-1, the UE-2, and the UE-3, respectively, and transmits the signals.

The UE-1 receives the useful MCSP index of 16 and the interfering MCSP index of 0 for the UE-3. Similarly, the UE-2 receives the useful MCSP index of 17 and the interfering MCSP index of 0 for the UE-3. The UE-3 receives the useful MCSP index of 0.

The UE (for example, the UE-1 and the UE-2 described above), in a case of receiving a plurality of indices (or deriving a plurality of indices from the received information), may assume that a specific index (for example, the first index) of the plurality of indices is the useful MCSP index, and the rest of the indices are the interfering MCSPs indices.

The UE-1 may determine that the useful MCS is 16 Quadrature Amplitude Modulation (16QAM) ($Q_M$=4) and the target coding rate=340/1024, and the useful precoder is $[\text{sqrt}(0.2)e^{j\pi/8}\ 0]^T$, based on the MCS table (table I.B) and the useful MCSP index of 16.

The UE-1 may determine that the interfering MCS is Quadrature Phase Shift Keying (QPSK) ($Q_M$=2) and the target coding rate=120/1024, and the interfering precoder is $[\text{sqrt}(0.8)e^{j\pi/8}\ \text{sqrt}(0.8)e^{j5\pi/8}]^T$, based on the MCS table (table I.B) and the interfering MCSP index of 0.

The UE-2 may determine that the useful MCS is 16QAM ($Q_M$=4) and the target coding rate=378/1024, and the useful precoder is $[0\ \text{sqrt}(0.2)e^{j5\pi/8}]^T$, based on the MCS table (table I.B) and the useful MCSP index of 17.

The UE-2 may determine that the interfering MCS is QPSK ($Q_M$=2) and the target coding rate=120/1024, and the interfering precoder is $[\text{sqrt}(0.8)e^{j\pi/8}\ \text{sqrt}(0.8)e^{j5\pi/8}]^T$, based on the MCS table (table I.B) and the interfering MCSP index of 0.

The UE-3 may determine that the useful MCS is QPSK ($Q_M$=2) and the target coding rate=120/1024, and the useful precoder is $[\text{sqrt}(0.8)e^{j\pi/8}\ \text{sqrt}(0.8)e^{j5\pi/8}]^T$, based on the MCS table (table I.B) and the useful MCSP index of 0.

Each of the UE-1 to the UE-3 can reconstruct a sub-matrix of the NOMA precoder $W_3$ to perform interference cancellation and advanced data detection (the sub-matrix includes the useful precoder and the interfering precoders (if any)), based on the received one or plurality of MCS indices.

Note that the method 3-1-1 describes the case that two beams are used for three UEs, but the number of UEs and the number of beams are not limited thereto.

According to the method 3-1-1, for example, the number of combinations of the numbers of NOMA precoders can be increased, and thus, flexible control is possible. An amount of information required for notification of the useful precoder, the interfering precoder, and the like can be preferably reduced.

(Method 3-1-2)

One MCS table may define the MCS related parameters and the NOMA precoders for a plurality of UEs (for example, all UEs as targets of the NOMA) of a plurality of NOMA UEs.

FIG. 18 is a diagram to show examples of the MCS table according to the method 3-1-2. Each of these MCS tables may be a table including the first column corresponding to the MCS index, the second column set indicating the MCS for two or more UEs, and the third column indicating the NOMA precoders for two or more UEs.

As shown in this example, different correspondence relations may be defined for different numbers of UEs (tables II.B-1 to B-4). In the tables II.B-1 to B-4, the second column sets (central three columns) indicate the MCS parameter matrices for two, three, four, and five UEs, and the third columns (rightmost columns) indicate the respective NOMA precoder matrices for two, three, four, and five UEs, which are different points.

A plurality of UEs may receive in common information relating to the MCSP used by all of the plurality of UEs. For example, the number of NOMA UEs, the table indices used by the plurality of UEs, the MCS indices used by all of the plurality of UEs, and the like may be received in common. In addition, each UE may individually receive information relating to a position of the useful MCSP (which may be also referred to as a useful MCSP index, for example). The useful MCSP index may be information indicating which column numbers in the specified MCS precoder matrix and NOMA precoder matrix indicate the useful MCS and the useful precoder correspond to, respectively.

Note that the table index is an index used to identify the table, and may be interchangeably interpreted as an index of a precoder or precoder matrix, an index of a NOMA type, and the like. The table indices of the tables II.B-1 to B-4 in FIG. 18 may be 1, 2, 3, and 4, respectively.

The UE not notified of the table index may identify a table to use, based on the number of NOMA UEs. For example, the UE notified of the number of NOMA UEs=2 can identify that the table to use is the table II.B-1 even in the case of not being notified of the table index.

The MCS index, the number of NOMA UEs (for example, K), the table index, the useful MCSP index, and the like may be notified to the UE through at least one of higher layer signaling (for example, at least one of RRC signaling and MAC CE) and physical layer signaling (for example, downlink control information (DCI)).

A plurality of UEs can reconstruct $W_3$ for data detection by receiving in common the indices of the NOMA precoder matrices used by all of the plurality of UEs.

The UE, once receiving the MCS index, the table index, and the useful MCSP index, can reconstruct a sub-matrix of $W_3$ for data detection and recognize the MCS for reception.

Figure 19:
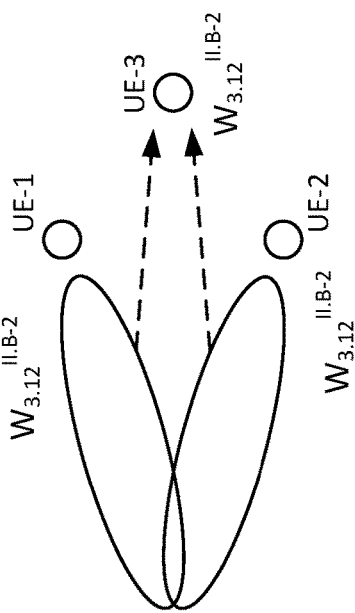
FIG. 19 is a diagram to show examples of a UE positional relation and an MCS table.

To be more specific, a description is given assuming a case that three UEs exist as shown in FIG. 19. Locations of the UE-1 to UE-3 in FIG. 19 are the same as those in FIG. 17.

In FIG. 19, the network applies $W_{3,12}^{II.B-2}$ to each of signals directed to the UE-1, the UE-2, and the UE-3, and transmits the signals.

In FIG. 19, the UE-1 receives the table index of 2, the MCS index of 12, and the useful MCSP index of 1. The UE-2 receives the table index of 2, the MCS index of 12, and the useful MCSP index of 2. The UE-3 receives the table index of 2, the MCS index of 12, and the useful MCSP index of 3.

The UE-1 may determine that the useful MCS is 16QAM ($Q_M$=4) and the target coding rate=378/1024, and the useful precoder is $[\text{sqrt}(0.2)\ e^{j\pi/8}\ 0]^T$, based on the MCS table (table II.B-2) referred based on the table index of 2, the MCS index of 12, and the useful MCSP index of 1.

The UE-2 may determine that the useful MCS is 16QAM ($Q_M$=4) and the target coding rate=434/1024, and the useful precoder is $[0\ \text{sqrt}(0.2)e^{j5\pi/8}]^T$, based on the MCS table (table II.B-2), the MCS index of 12, and the useful MCSP index of 2.

The UE-1 and the UE-2 may determine that specific columns (for example, the last column, or a column with the smallest number of elements having a value of '0') in the MCS parameter matrix and the precoder matrix correspond to the interfering MCSP.

The UE-3 may determine that the useful MCS is QPSK ($Q_M$=2) and the target coding rate=308/1024, and the useful precoder is $[\text{sqrt}\ (0.8)\ e^{j\pi/8}\ \text{sqrt}(0.8)e^{j5\pi/8}]^T$, based on the MCS table (table II.B-2), the MCS index of 12, and the useful MCSP index of 3.

Each of the UE-1 to the UE-3 can use the NOMA precoder $W_3$ to perform interference cancellation and advanced data detection, based on the received table index, one MCS index, and the useful MCSP index.

Note that the method 3-1-2 describes the case that two beams are used for three UEs, but the number of UEs and the number of beams are not limited thereto.

According to the method 3-1-2, the information relating to the NOMA precoder used by each UE can be transmitted at one time to reduce the overhead.

(Method 3-1-3)

In the method 3-1-3, a method in combination of the method 3-1-1 and the method 3-1-2 described above will be described. One MCS table may define the MCS related parameters and the NOMA precoders for one or a plurality of UEs (for example, all UEs as targets of the NOMA) of a plurality of NOMA UEs.

FIG. 20 is a diagram to show examples of the MCS table according to the method 3-1-3. Each of these MCS tables may be a table including the first column corresponding to the MCS index, the second column set indicating the MCS for one or more UEs, and the third column indicating the NOMA precoders for one or more UEs.

As shown in this example, different correspondence relations may be defined for different numbers of UEs (tables III.B-1 to B-4). In the tables III.B-1 to B-4, the second column sets (central three columns) indicate the respective MCS parameter matrices for one, two, three, and four UEs, and the third columns (rightmost columns) indicate the respective NOMA precoder matrices for one, two, three, and four UEs, which are different points.

The correspondence relation including the NOMA precoder for one UE (for example, table III.B-1) may be a correspondence relation for a UE not requiring (or not performing) interference cancellation. The correspondence relation including the NOMA precoder for two or more UEs (for example, tables III.B-2 to B-4) may be a correspondence relation for a UE requiring cancellation of the interferences of other UEs.

The UE, of a plurality of UEs, not requiring (or not performing) the interference cancellation may receive the information relating to the correspondence relation for the NOMA precoder to use (for example, the number of NOMA UEs, the table index) and the MCS index.

The UE, of a plurality of UEs, requiring canceling the interferences of other UEs may receive the information relating to the correspondence relation for the NOMA precoder matrix to use (for example, the number of NOMA UEs, the table index), the MCS index, and the information relating to the position of the useful MCSP (for example, the useful MCSP index described above in the method 3-1-2).

The UE requiring cancellation of the interferences of other UEs may assume that a specific column in the specified MCS or precoder matrix (for example, the first column) is the useful MCS or precoder, even in a case of not receiving the above useful MCSP index. Specifically, the useful MCSP index may be implicitly notified by way of (the MCS or precoder matrix corresponding to) the MCS index.

The MCS index, the number of NOMA UEs (for example, K), the table index, the useful MCSP index, and the like may be notified to the UE through at least one of higher layer signaling (for example, at least one of RRC signaling and MAC CE) and physical layer signaling (for example, downlink control information (DCI)).

The UE, once receiving the MCS index, the table index, and the useful MCSP index (as needed), can reconstruct a sub-matrix of $W_3$ for data detection and recognize the MCS for reception.

Figure 21:
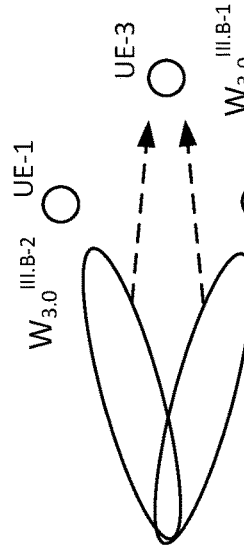
FIG. 21 is a diagram to show examples of a UE positional relation and an MCS table.

To be more specific, a description is given assuming a case that three UEs exist as shown in FIG. 21. Locations of the UE-1 to UE-3 in FIG. 21 are the same as those in FIG. 17.

In FIG. 21, the table III.B-1 may be of a correspondence relation for a UE that is poor in the channel state and so requires high power (for example, the UE-3). On the other hand, the table III.B-2 may be of a correspondence relation for a UE that is excellent in the channel state and so does not require high power (for example, the UE-1 or the UE-2).

In FIG. 21, the network applies (part of) $W_{3,0}^{III.B-2}$, (part of) $W_{3,1}^{III.B-2}$, and $W_{3,0}^{III.B-1}$ to signals directed to the UE-1, the UE-2, and the UE-3, respectively, and transmits the signals.

In FIG. 21, the UE-1 receives the table index of 2, the MCS index of 0, and the useful MCSP index of 1. The UE-2 receives the table index of 2, the MCS index of 1, and the useful MCSP index of 1. The UE-3 receives the table index of 1 and the MCS index of 0.

The UE-1 may determine that the useful MCS is 16QAM ($Q_M$=4) and the target coding rate=340/1024, and the useful precoder is $[sqrt(0.2)e^{j\pi/8}\ 0]^T$, based on the MCS table (table III.B-2) referred based on the table index of 2, the MCS index of 0, and the useful MCSP index of 1.

The UE-2 may determine that the useful MCS is 16QAM ($Q_M$=4) and the target coding rate=378/1024, and the useful precoder is $[0\ sqrt(0.2)e^{j5\pi/8}]^T$, based on the MCS table (table III.B-2) referred to based on the table index of 2, the MCS index of 1, and the useful MCSP index of 1.

The UE-1 and the UE-2 may determine that specific columns (for example, the last column, or a column with the smallest number of elements having a value of '0') in the MCS parameter matrix and the precoder matrix correspond to the interfering MCSP.

The UE-3 may determine that the useful MCS is QPSK ($Q_M$=2) and the target coding rate=120/1024, and the useful precoder is $[sqrt(0.8)e^{j\pi/8}\ sqrt(0.8)e^{j5\pi/8}]^T$, based on the MCS table (table III.B-1) referred to based on the table index of 1 and the MCS index of 0.

Each of the UE-1 and the UE-2 can use the NOMA precoder $W_3$ to perform interference cancellation and advanced data detection, based on the received table index, one MCS index, and the useful MCSP index.

The UE-3 can reconstruct the sub-matrix of the NOMA precoder $W_3$ to perform advanced data detection, based on the received table index and one MCS index Note that the method 3-1-3 describes the case that two beams are used for three UEs, but the number of UEs and the number of beams are not limited thereto.

According to the method 3-1-3, the flexible control and the overhead reduction can be preferably traded off with each other.

<Others>

Note that the notification method of the NOMA precoder, the MCSP, or the like described in the second embodiment, the third embodiment, or the like may be used in a case that the power domain NOMA is applied.

A method for implementing each of the tables shown in the present disclosure is not limited thereto so long as the correspondence relations indicated in those tables are satisfied. For example, the UE may derive a NOMA precoder, an MCS parameter, or the like corresponding to a certain index, based on a function satisfying the correspondence relation indicated in the table. The table, the correspondence relation, the relation, the association, and the like in the present disclosure may be interchangeably interpreted.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 22:
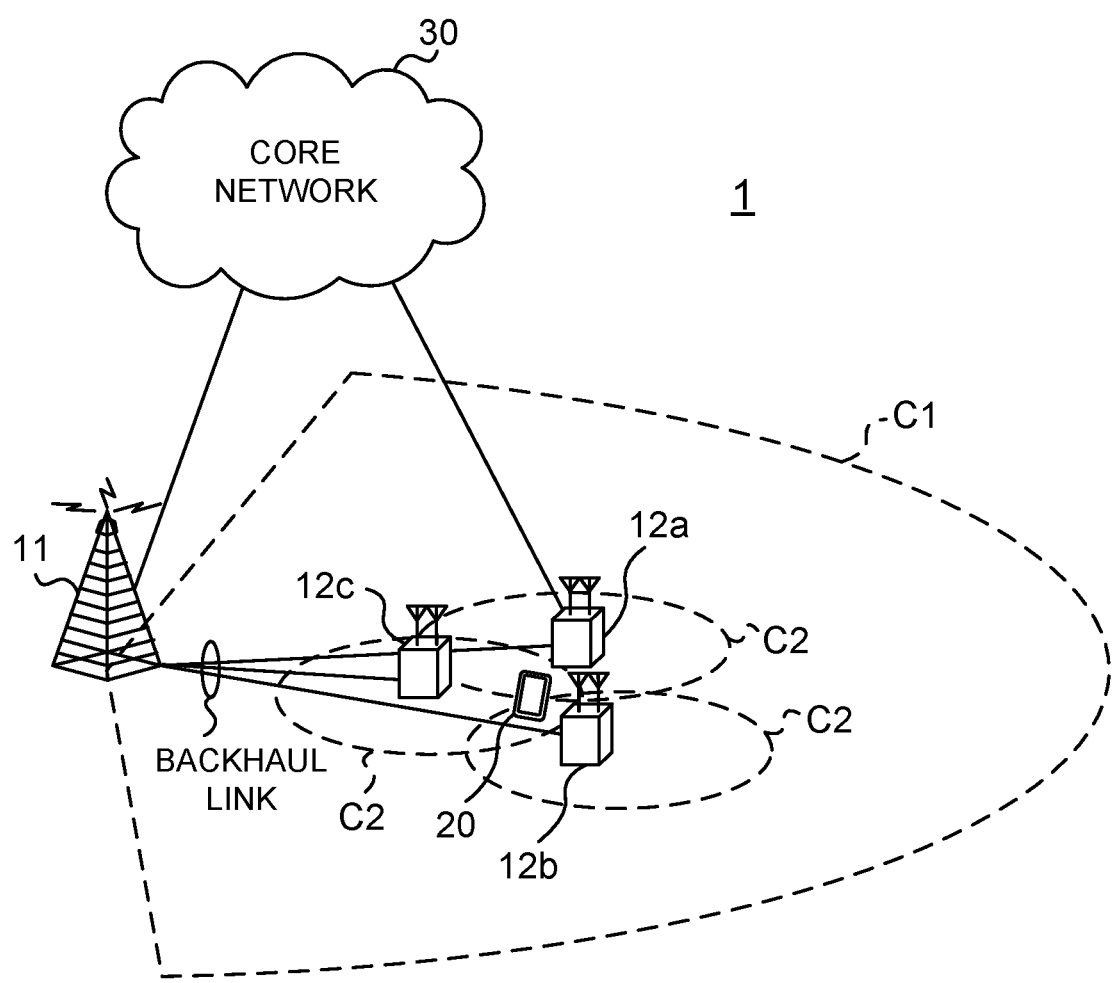
FIG. 22 is a diagram to show an example of a schematic structure of a radio communication system according to one embodiment.

FIG. 22 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 23:
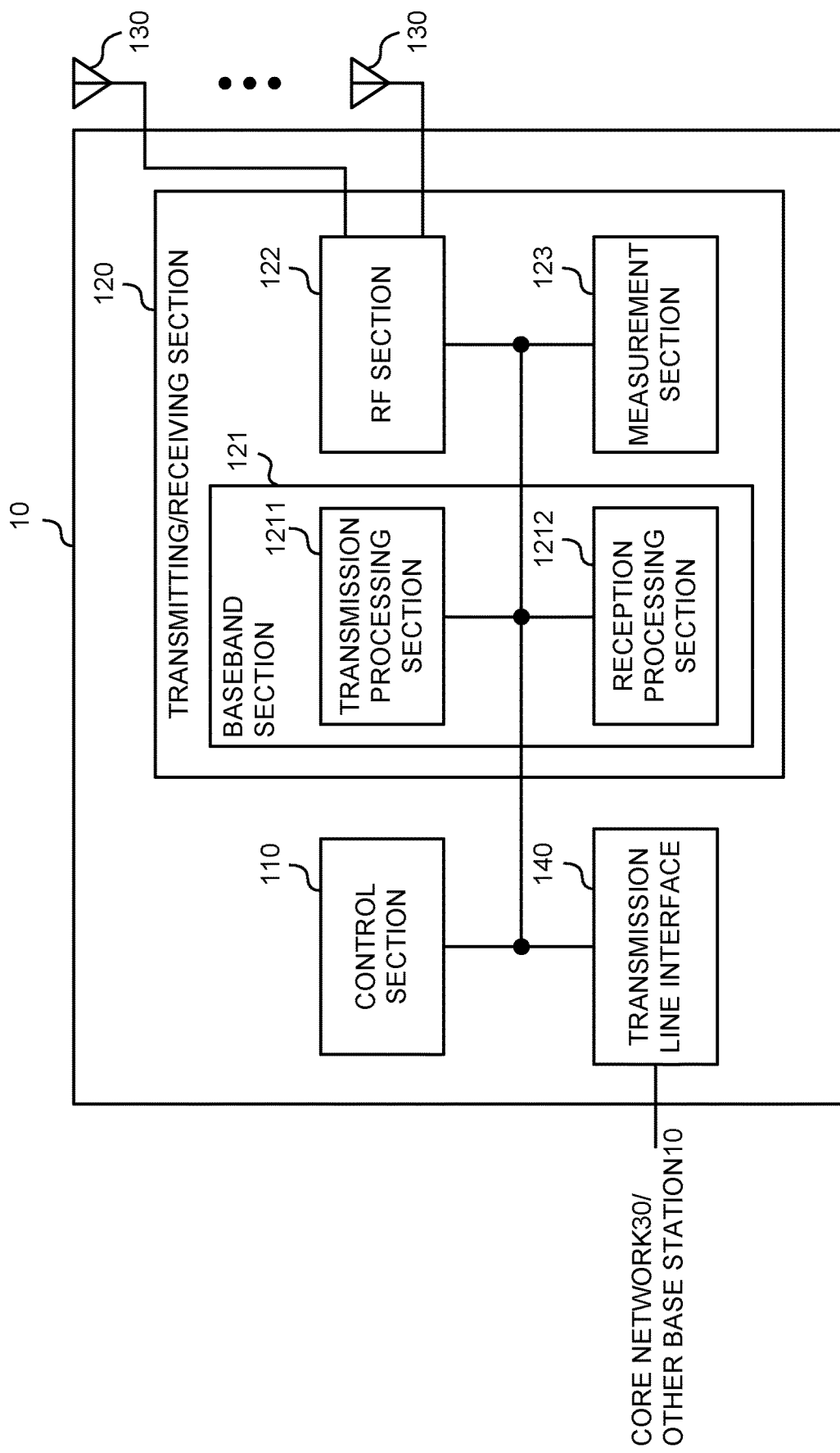
FIG. 23 is a diagram to show an example of a structure of a base station according to one embodiment.

FIG. 23 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can include a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may include a transmitting section and a receiving section. The transmitting section may include the transmission processing section 1211, and the RF section 122. The receiving section may include the reception processing section 1212, the RF section 122, and the measurement section 123.

The transmitting/receiving antennas 130 can include antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may include at least one of the transmitting/receiving section 120, the transmitting/receiving antennas 130, and the communication path interface 140.

(User Terminal)

Figure 24:
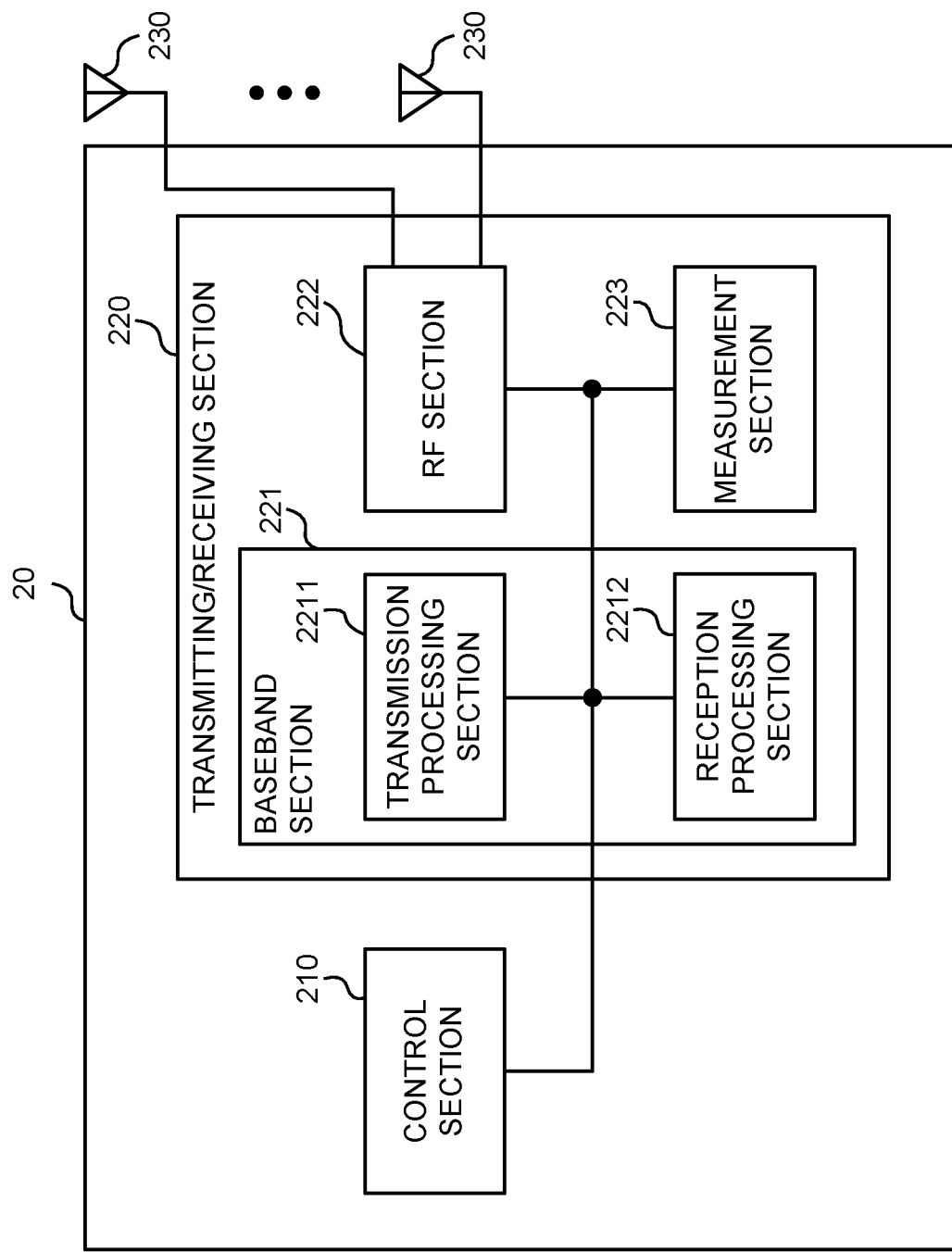
FIG. 24 is a diagram to show an example of a structure of a user terminal according to one embodiment.

FIG. 24 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can include a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may include a transmitting section and a receiving section. The transmitting section may include the transmission processing section 2211, and the RF section 222. The receiving section may include the reception processing section 2212, the RF section 222, and the measurement section 223.

The transmitting/receiving antennas 230 can include antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may include at least one of the transmitting/receiving section 220 and the transmitting/receiving antennas 230.

The transmitting/receiving section 220 receives demodulation reference signal (DMRS) information relating to at least one resource of a DMRS, and to the DMRS, a first precoder for a beam may be applied and a second precoder for superposing a plurality of signals to be transmitted using the same beam may not be applied. The control section 210 may demodulate a physical downlink shared channel (PDSCH) that is transmitted using the first precoder and the second precoder, based on the DMRS and information relating to the second precoder.

In a case that the DMRS information indicates more than one resource, the control section 210 may demodulate the PDSCH by using more than one beam.

In a case that the DMRS information indicates one resource, the control section 210 may demodulate the PDSCH by using one beam.

The number of beams based on the first precoder may be less than the number of terminals that receive signals based on the first precoder and the second precoder.

The transmitting/receiving sections 220 may receive the information relating to the second precoder.

The transmitting/receiving section 220 may receive the information relating to the second precoder for superposing a plurality of signals to be transmitted using the same beam. The control section 210 may control reception processing of the signals to which the first precoder for the beam and the second precoder are applied, based on the information relating to the second precoder.

The information relating to the second precoder may include information relating to the second precoder that is quantized, and the control section 210 may control the reception processing of the signals by using at least part of the second precoder reconstructed from the second precoder that is quantized, based on at least one of a quantization function and a quantization criterion.

The information relating to the second precoder may include an index for identifying part of the second precoder applied to one terminal, and the control section 210 may control the reception processing of the signals, based on the index for identifying part of the second precoder applied to the terminal itself and the index for identifying another part of the second precoder applied to another terminal.

The information relating to the second precoder may include a first index (for example, the precoder index) for identifying the second precoder applied to a plurality of terminals, a second index (for example, the table index) for identifying a correspondence relation between the first index and the second precoder, and a third index (for example, the useful precoder index) for identifying part of the second precoder applied to the terminal itself, and the control section 210 may identify the second precoder based on the first index and identify part of the second precoder, based on the third index in the correspondence relation identified based on the second index, to control the reception processing of the signals.

The transmitting/receiving section 220 may receive the information relating to the second precoder (for example, $W_3$) for superposing a plurality of signals transmitted using the same beam. The information relating to the second precoder may include a modulation and coding scheme (MCS) index. Note that in the present disclosure, the information relating to the second precoder may include the MCS index, the number of NOMA UEs, the table index, the precoder (or MCSP) index, the useful precoder (or useful MCSP) index, the interfering precoder (or interfering MCSP) index, and the like.

The control section 210 may determine at least part of the second precoder used for the reception processing of the signals to which the first precoder for a beam (for example, $W_1*W_2$) and the second precoder are applied (for example, part of the second precoder applied to the terminal itself), and the MCS parameter applied to at least one of the terminal itself and another terminal, based on the information relating to the second precoder.

The control section 210 may perform control of performing interference cancellation on the signals in a case that a plurality of MCS indices are notified, and control of not performing interference cancellation on the signals in a case that only one MCS index is notified.

The control section 210 may identify the correspondence relation for the MCS index (for example, MCSP table), based on the second index (for example, the table index), and determine at least part of the second precoder used for the reception processing of the signals and the MCS parameter, based on the correspondence relation and the MCS index.

The control section 210 may determine part of the second precoder applied to the terminal itself and the MCS parameter applied to the terminal itself, based on the correspondence relation, the MCS index, and the third index (for example, the useful MCSP index) for identifying part of the second precoder applied to the terminal itself.

In the correspondence relation (each MCS table), the MCS index having a relatively low value may be associated with the second precoder corresponding to more beams, and the MCS index having a relatively high value may be associated with the second precoder corresponding to less beams.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 25:
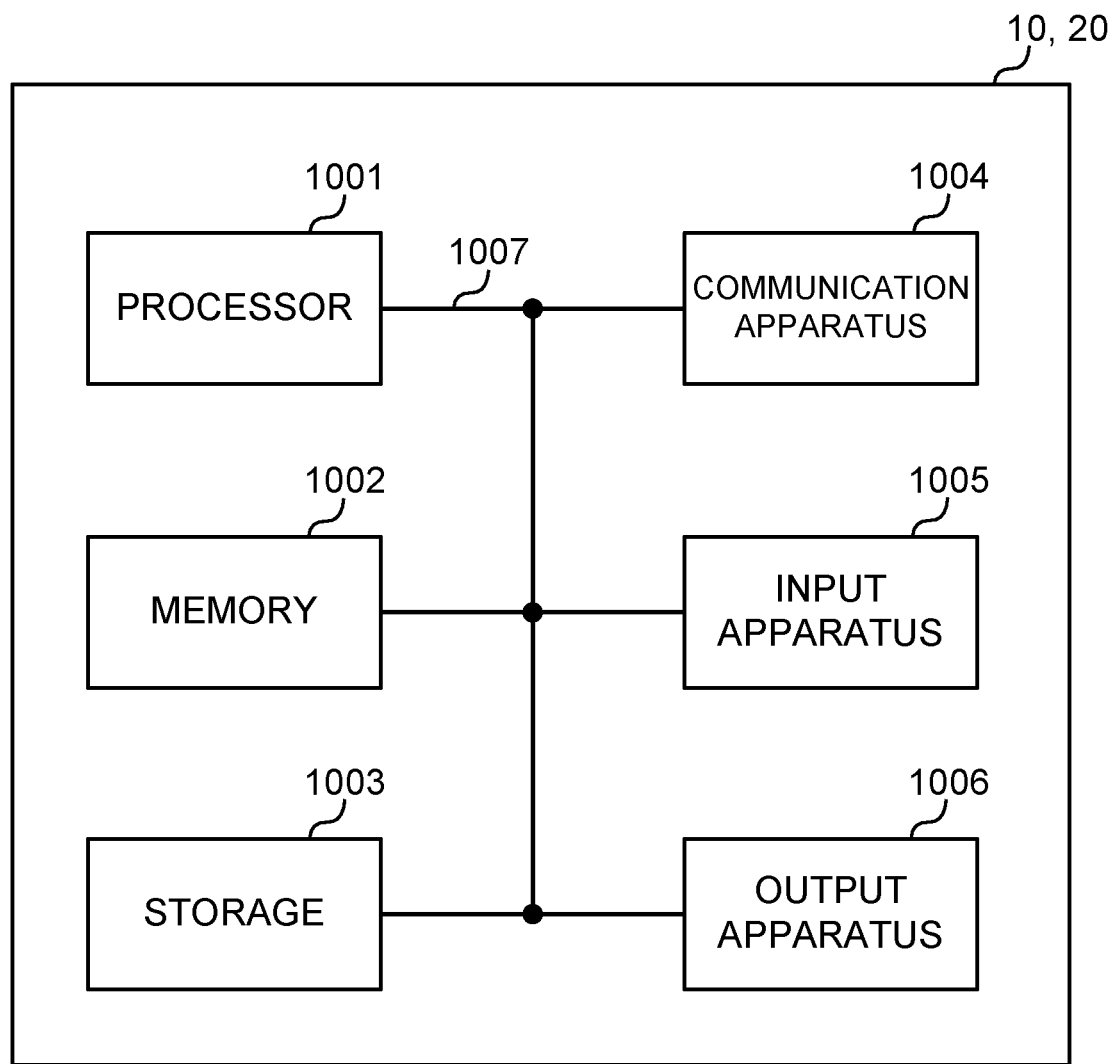
FIG. 25 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 25 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may include one or a plurality of periods (frames) in the time domain. Each of one or a plurality of periods (frames) constituting a radio frame may be referred to as a "subframe." Furthermore, a subframe may include one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may include one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may include one or a plurality of symbols in the time domain. A mini-slot may be referred to as a "sub-slot." A mini-slot may include symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may include one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may include one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:
1. A terminal comprising:
a receiving section that receives demodulation reference signal (DMRS) information relating to at least one resource of a DMRS, wherein only a first precoder, among the first precoder and a second precoder, is applied to the DMRS, wherein the first precoder is for a beam and the second precoder is for superposing a signal for the terminal and a signal for another terminal, the signal for the terminal and the signal for the another terminal being transmitted using a same beam; and a control section that demodulates a physical downlink shared channel (PDSCH) transmitted using the first precoder and the second precoder, based on the DMRS and information relating to the second precoder.

2. The terminal according to claim 1, wherein in a case that the DMRS information indicates more than one resource, the control section demodulates the PDSCH by using more than one beam.

3. The terminal according to claim 1, wherein in a case that the DMRS information indicates one resource, the control section demodulates the PDSCH by using one beam.

4. The terminal according to claim 1, wherein the number of beams based on the first precoder is less than the number of terminals that receive signals based on the first precoder and the second precoder.

5. The terminal according to claim 1, wherein the receiving section receives the information relating to the second precoder.

6. A radio communication method of a terminal, the radio communication method comprising:

receiving demodulation reference signal (DMRS) information relating to at least one resource of a DMRS, wherein only a first precoder, among the first precoder and a second precoder, is applied to the DMRS, wherein the first precoder is for a beam and the second precoder is for superposing a signal for the terminal and a signal for another terminal, the signal for the terminal and the signal for the another terminal being transmitted using a same beam; and demodulating a physical downlink shared channel (PDSCH) transmitted using the first precoder and the second precoder, based on the DMRS and information relating to the second precoder.

7. The terminal according to claim 2, wherein in a case that the DMRS information indicates one resource, the control section demodulates the PDSCH by using one beam.

8. The terminal according to claim 2, wherein the number of beams based on the first precoder is less than the number of terminals that receive signals based on the first precoder and the second precoder.

9. The terminal according to claim 3, wherein the number of beams based on the first precoder is less than the number of terminals that receive signals based on the first precoder and the second precoder.

10. The terminal according to claim 2, wherein the receiving section receives the information relating to the second precoder.

11. The terminal according to claim 3, wherein the receiving section receives the information relating to the second precoder.

12. The terminal according to claim 4, wherein the receiving section receives the information relating to the second precoder.

* * * * *